US008831021B2

United States Patent
Deivasigamani et al.

(10) Patent No.: US 8,831,021 B2
(45) Date of Patent: Sep. 9, 2014

(54) SYSTEM AND METHOD FOR DYNAMICALLY CONFIGURABLE MULTI-WINDOW DIVERGENT PROTOCOL BRIDGE

(75) Inventors: Vinoth Kumar Deivasigamani, San Diego, CA (US); Brent Gene Duckering, San Diego, CA (US); Chung Chih Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 13/244,538

(22) Filed: Sep. 25, 2011

(65) Prior Publication Data
US 2013/0077635 A1 Mar. 28, 2013

(51) Int. Cl.
*H04L 12/56* (2006.01)

(52) U.S. Cl.
USPC .............. 370/402; 370/395.6; 370/466

(58) Field of Classification Search
USPC .......... 370/395.5, 395.6, 400–403, 428–429, 370/465–466
See application file for complete search history.

(56) References Cited

U.S. PATENT DOCUMENTS

| | | | |
|---|---|---|---|
| 6,108,738 A * | 8/2000 | Chambers et al. ............ | 710/113 |
| 6,198,751 B1 | 3/2001 | Dorsey et al. | |
| 6,385,194 B2 * | 5/2002 | Surprenant et al. .......... | 370/353 |
| 6,636,519 B1 * | 10/2003 | Walsh et al. ................. | 370/401 |
| 6,778,530 B1 | 8/2004 | Greene | |
| 7,113,520 B1 | 9/2006 | Meenan | |
| 7,218,007 B2 * | 5/2007 | Shi et al. ....................... | 257/778 |
| 7,586,908 B2 * | 9/2009 | Nelson et al. ................ | 370/353 |
| 7,813,359 B1 | 10/2010 | Yamawaki | |
| 8,155,135 B2 * | 4/2012 | Aloni et al. .................. | 370/419 |
| 2003/0174722 A1 * | 9/2003 | Black et al. .................. | 370/403 |
| 2004/0024943 A1 | 2/2004 | Lupien et al. | |
| 2004/0090967 A1 | 5/2004 | Doidge et al. | |
| 2008/0205421 A1 * | 8/2008 | Black et al. .................. | 370/401 |
| 2010/0014459 A1 | 1/2010 | Mir et al. | |
| 2010/0017547 A1 | 1/2010 | Das et al. | |

OTHER PUBLICATIONS

International Search Report and Written Opinion—PCT/US2012/057135—ISA/EPO—Jun. 11, 2013.

* cited by examiner

*Primary Examiner* — Kevin Mew
(74) *Attorney, Agent, or Firm* — Peter Michael Kamarchik; Nicholas J. Pauley; Joseph Agusta

(57) ABSTRACT

A bridge interfaces a first network protocol and a second network interface protocol. Each of a plurality of mapping windows is defined by corresponding mapping parameters defining a space in the first protocol and defining the mapping window translation rules to the second network protocol. Transaction requests in the first network protocol are selectively associated with the mapping windows.

38 Claims, 9 Drawing Sheets

US 8,831,021 B2

SYSTEM AND METHOD FOR DYNAMICALLY CONFIGURABLE MULTI-WINDOW DIVERGENT PROTOCOL BRIDGE

FIELD OF DISCLOSURE

The present disclosure relates to network communications and, more particularly, to communications among divergent protocols.

BACKGROUND

Efficiency and transparency are generally among the goals in designing a bridge between different protocols. Labeling either of the disparate protocols the "source" protocol and the other the "target" protocol, one metric of efficiency is the bridge's ability to utilize all features of the source protocol—instead of a limited subset. Another metric of bridge efficiency is the ability of transactions originated in the source protocol to utilize features of the target protocol. Transparency of a bridge means that transactions originated in a source protocol and do not require knowledge of the bridge; if a bridge is fully transparent to a source protocol there is no difference between transactions that will be carried by the bridge and transactions remaining within the source protocol.

However, conventional bridge design generally requires trade-offs and compromises between the goals of efficiency and transparency. As one example, transparency generally requires a bridge to have fixed translation rules. The requirement that translation rules applied by a conventional bridge be fixed to maintain bridge transparency generally means that the conventional bridge provides for only a basic, fixed subset of the target protocol features. Selection of this basic, fixed subset of the target protocol features requires making significant trade-offs that can be a difficult and time consuming task.

SUMMARY

Exemplary embodiments of the invention are directed to systems and methods for dynamically configurable bridging disparate protocols.

One example bridge according to one exemplary embodiment may comprise a first bus interface protocol port configured to receive a first bus interface protocol transaction request having a transaction request parameter, a second bus interface protocol port; a protocol mapping controller configured to select from a plurality of mapping windows, each of the mapping windows dynamically configurable, according to a value of the transaction request parameter, and to map the first bus interface protocol transaction request to a bus interface protocol transaction request on the second bus interface protocol port in accordance with the selected mapping window.

In one aspect at least one of the mapping windows may include a dynamically configurable target device identifier having a value identifying a second bus interface protocol device.

In another aspect at least one of the mapping windows may include a dynamically configurable target window identifier having a value identifying an address space in the second bus interface protocol.

In another aspect the protocol mapping controller may include a plurality of mapping window registers, and may be configured to store each mapping window in the mapping window registers as a corresponding plurality of dynamically configurable transaction mapping parameters.

In another aspect the controller may be configured to store the plurality of dynamically configurable transaction mapping parameters of each mapping window in a corresponding sub-plurality of the window registers In one aspect at least one of the plurality of dynamically configurable transaction mapping parameters may include a mapping window location parameter having a value corresponding to a destination in the first bus interface protocol.

In another aspect at least one of the plurality of dynamically configurable transaction mapping parameters may include a translation logic parameter defining at least one translation rule for translating the transaction request according to the first bus interface protocol into a transaction request according to the second bus interface protocol.

In one aspect, at least one of the plurality of dynamically configurable transaction mapping parameters may include a mapping window location parameter indicating an address space in the first bus interface protocol. In one related aspect, a first bus interface protocol port may be further configured to receive a first bus interface protocol transaction request having a transaction request parameter indicating a destination address, and wherein the protocol mapping controller may be further configured to select the mapping window, if any, having a mapping window location parameter indicating an address space in the first bus interface protocol matching the destination address.

In one aspect at least one of the plurality of dynamically configurable transaction mapping parameters of a mapping window may include a translation logic parameter defining at least one translation rule for translating the transaction request according to the first bus interface protocol into a transaction request according to the second bus interface protocol. In one related aspect, at least one translation logic parameter may include a mapped transaction priority parameter indicating a transaction priority level within the second bus interface protocol.

In one aspect, at least two mapping windows may have respective mapping window location parameters indicating mutually different address spaces in the first bus interface protocol, with each of the at least two mapping windows identifying the same window in the second bus interface protocol.

In one aspect at least two mapping windows may have mapped transaction priority parameters indicating mutually different transaction priority levels in the second bus interface protocol.

In another aspect at least one translation logic parameter of at least one mapping window may include a mapped transaction confirmation parameter indicating a transaction confirmation mode within the second bus interface protocol. In a related aspect at least two mapping windows may have mapped confirmation mode parameters indicating mutually different confirmation modes in the second bus interface protocol.

One example method according to one exemplary embodiment may include receiving a first bus interface protocol transaction request having a transaction request parameter, selecting from a plurality of mapping windows according to a value of the transaction request parameter; and mapping the first bus interface protocol transaction request to a bus interface protocol transaction request in accordance with the selected mapping window.

One example method according to one exemplary embodiment may further include means for programming at least one of the plurality of mapping windows. In one aspect programming at least one of the plurality of mapping windows may include receiving a mapping window programming command in the first bus interface protocol, and programming at least one of the mapping windows in accordance with the received mapping window programming command.

In one aspect, programming at least one of a plurality of mapping windows may include generating a mapping window programming command having a destination address and having at least window parameter, selecting at least one of the mapping windows, based on the destination address, and configuring a mapping window register or mapping window registry associated with the at least one mapping window, based on the mapping window programming command. In one aspect the configuring may include receiving a mapping window programming command in the second bus interface protocol, translating the received mapping window programming command in the second bus interface protocol to a mapping window programming command packet in the first bus interface protocol, having a target address associated with at least one of the mapping windows, routing the mapping window programming command packet in the first bus interface protocol to a mapping window registry associated with the target address, programming the mapping window registry on accordance with the routed mapping window programming command packet in the first bus interface protocol.

One example bridge according to one exemplary embodiment may comprise means for receiving a first bus interface protocol transaction request having a transaction request parameter, means for selecting from a plurality of mapping windows according to a value of the transaction request parameter, and means for mapping the first bus interface protocol transaction request to a bus interface protocol transaction request in accordance with the selected mapping window.

In one aspect, one bridge according to one exemplary embodiment may further include means for storing each mapping window as a corresponding plurality of dynamically configurable transaction mapping parameters.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
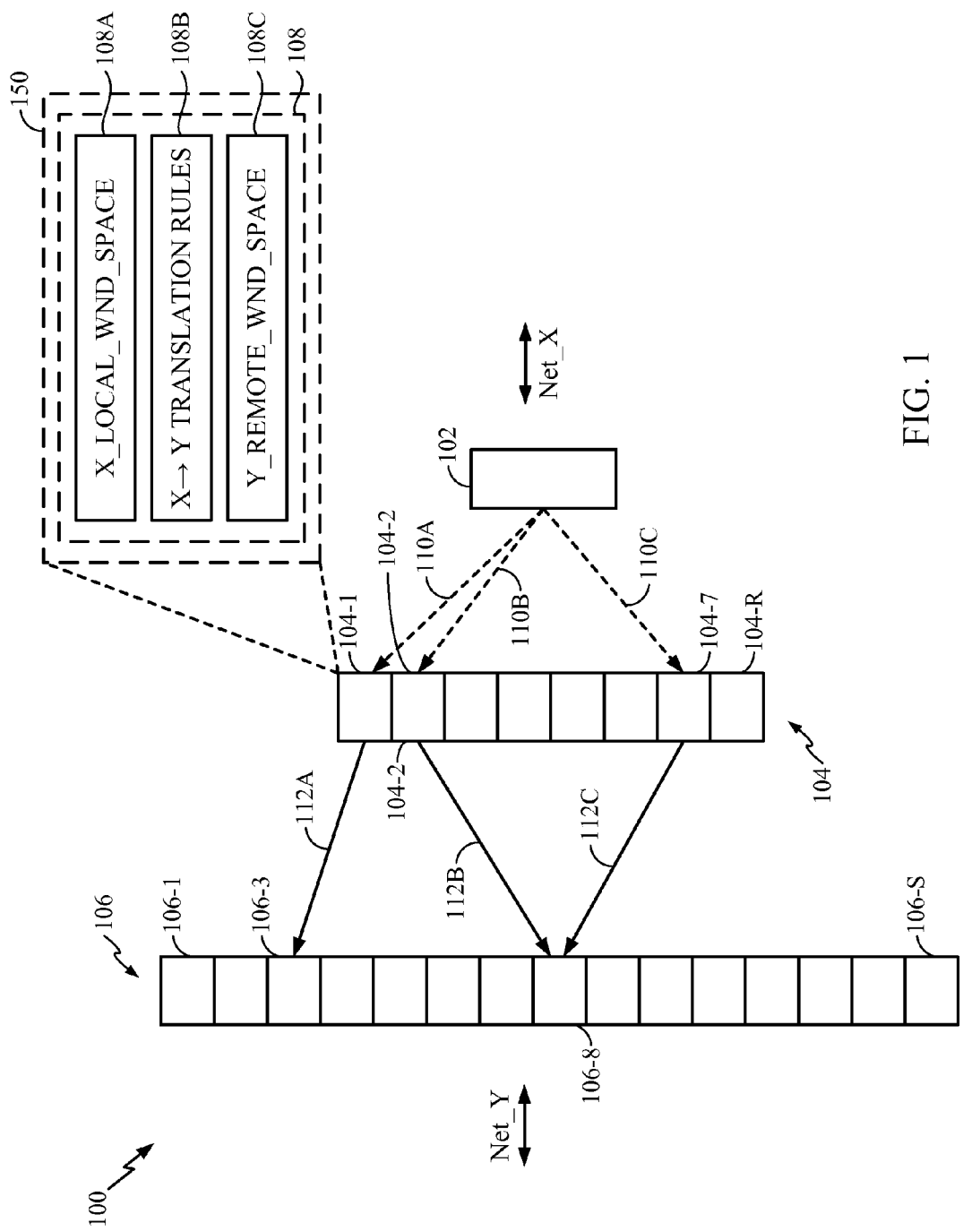
FIG. 1 is a high level logic block diagram of one example dynamically configurable multi-window protocol mapping system according to one exemplary embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

It will be understood that the term "network" is intended to mean "interconnect, network or bus" and to encompass the broadest meaning of these terms as understood by persons of ordinary skill in the communication and processing arts, without limitation as to medium, protocol, format, coding, or information rate. It will also be understood that except where otherwise stated, or made clear from the context to be other otherwise, the terms "destination" and "target" are interchangeable.

Exemplary embodiments provide, according to various aspects described in greater at later sections, dynamically configurable translation and interfacing between two or more disparate protocol networks. Example disparities in protocol that may be accommodated include differences in address range, differences in respective libraries of transaction requests, differences in respective criteria of completing of transactions defined by transaction requests.

Exemplary embodiments provide a dynamically configurable bridge between disparate protocols having, in contrast to a single set of translation rules for bridging the protocols, a plurality of individually configurable bridging windows, each of the windows having its own set of translation rules for translating transaction requests from one of the disparate protocols into a transaction request within the other of the disparate protocols. In an aspect, certain of the bridging windows can be configured to translate transaction requests from, for example, a protocol X to a protocol Y in a manner that minimizes the latency in performing the transaction in the protocol Y. In a related aspect, one or more other of the bridging windows be configured to translate transaction requests from, for example, the same protocol X to the same protocol Y in a manner that, in contrast, provides a higher certainty that the transaction will be completed.

As one specific example, a read transaction in the X protocol may be translatable to either of two or more different kinds of read requests in the Y protocol. One of these kinds of Y protocol read requests may have a low latency, but without any confirmation of a transaction complete being sent back, while another of these kinds of Y protocol read requests may provide a confirmation of transaction complete, but have a significantly longer latency. Exemplary embodiments can provide a dynamically configurable bridge between the X and Y protocols having at least one individually configurable bridging window configured to translate X protocol read transactions into the Y protocol read requests having a low latency, but without confirmation of the transaction complete, and another individually configurable bridging window configured to translate X protocol read transactions into the Y protocol read request providing a confirmation of transaction complete, but having a significantly longer latency.

Exemplary embodiments provide selection from the X protocol to a desired one of the above-described two different dynamically configured, individually configurable bridging windows. In an aspect, selection between the two (or more) different individually configurable bridging windows can be provided by assigning each of the individually configurable bridging windows an address in the X protocol. This, in turn, provides flexibility in writing software in the X protocol to optimized use of features in the Y protocol, by merely changing an address field of the transaction requests. This flexibility is not available with prior art bridges as these provide, in contrast, only one set of translation rules. Even if reconfigurable, the overhead required for such reconfiguration can render the one set of translation rules substantially fixed, at least during normal operations.

The above examples are only illustrations, not intended to limit the scope of any embodiment or any aspect thereof. For example, a plurality of individually configurable bridging windows can be provided for Y to X protocol translation, or translation for both X to Y and Y to X.

One embodiment provides a dynamically configurable (DC) multiple window bridge having, in one aspect, an X→array of R dynamically configurable X→Y mapping windows local to the X protocol, alternatively referenced as "X-local X→Y mapping windows." In another aspect, each of the R X-local X→Y mapping windows may be embodied as parameter values defining, for example, window boundaries in the X→Y protocol address space, a target window in the Y protocol, and one or more X→Y transaction translation logic rules. In one aspect, an example dynamically configurable multiple window bridge of one embodiment, upon receiving an X protocol transaction request, may select an X-local X→Y mapping window to the Y protocol according to the transaction request's destination or target. In one example according to this aspect, at each instance of a dynamically configurable multiple window bridge receiving an X protocol transaction request having a destination address that is within the boundaries of one of the X-local X→Y mapping windows, the X protocol transaction request is mapped to the Y protocol according to the translation logic rules defined for that one X-local X→Y mapping window.

In an aspect, one DC multiple window bridge according to one embodiment may provide for R X-local X→Y mapping windows by storing, or having access to R sets of X-local X→Y window parameter registers. Each X-local X→Y window parameter register set may store, as dynamically configurable values, an X→Y mapping parameter set. In one aspect, an X→Y mapping parameter set may include an X-local window boundary indicating, for example, an address space in the X protocol. In a further aspect the X→Y mapping parameter set may include a Y-remote window register defining a Y-remote window to which the X-local X→Y mapping window maps. As described in greater detail at later sections, the Y-remote window register may, for example, represent the Y-remote window as an address space in the Y protocol or, in one example alternative, may represent the Y-remote window as a device, by its device identifier in the Y protocol.

In another aspect, an X→Y mapping parameter set stored by each X-local X→Y window parameter register set may include X→Y transaction translation logic rules by which the local X→Y mapping window defined by that MPR register set translates X protocol transaction requests into Y protocol transaction requests.

In one aspect, one DC multiple window bridge according to one embodiment may provide through, for example, a DC multiple window configuration controller, dynamic access to the X-local X→Y window parameter register sets.

In another aspect, one DC multiple mapping window bridge according to one embodiment may include one or more X-protocol interface physical ports and one or more Y-protocol physical ports. One example DC multiple mapping window bridge according to one embodiment may include for either of, or both of the X-protocol interface or Y-interface physical ports, one or more master ports and one or more slave ports.

In an aspect, one DC multiple mapping window bridge according to one embodiment may provide for configuring two or more X-local X→Y window parameter register sets to have the same Y-remote window identifier in their respective Y-remote window registers, but different X-local window identifiers in their respective X-local X→Y mapping window identifier registers, and different logic rules in their respective X→Y transaction translation logic rule registers. As will be appreciated, this feature may provide transaction requests originating in the X protocol network, directed to a particular destination in the Y-protocol network, with selectable X→Y transaction translation logic rules. As illustration of features that may be provided by this aspect, a first and a second X-local X→Y window parameter register set, having respective X-local window identifiers defining mutually different X-local window boundaries, may be configured to have the same Y-remote window identifier. The first and second X-local X→Y window parameter register sets may therefore respectively define two different transaction translation rule sets to the same Y window.

FIG. 1 is a high level logic block diagram of one example dynamically configurable (DC) multi-window X⇌Y bridge 100 according to one exemplary embodiment. The DC multi-window X⇌Y bridge 100 is shown interfacing an "X protocol" network labeled Net_X and a "Y protocol" network labeled Net_Y. It will be understood that the labels X, Net_X, Y, and Net_Y are arbitrary, and not intended to reference any particular protocol or protocol type.

Referring to FIG. 1, the example DC multi-window X⇌Y bridge 100 may include a mapping window selection logic 102 and logic providing R Net_X local mapping windows 104-r, for r=1 to R (referenced collectively as "104"). Each Net_X local mapping window 104 maps X protocol transaction requests to dynamically selectable ones of S Net_Y remote windows 106-s, for s=1 to S (referenced generically as "106-s" and collectively as "106") in the Y protocol network. Net_Y remote windows 106-1, 106-3, 106-8 and 106-S are examples of the Net_Y remote windows 106. Each Net_X local mapping window 104, i.e., each of 104-1, 104-2 . . . 104-R, may correspond to an address space within the X protocol, and each of the S Net_Y remote windows 106 may correspond to an address space in the Y protocol network.

In one aspect, the DC multi-window X⇌Y bridge 100 may maintain and provide for dynamic configuration of an X→Y map_r associated with each Net_X local mapping window 104. In one example implementation according to this aspect, each X→Y map_r may define the X protocol address space of the Net_X local mapping window 104-r, the "s" identity of the Net_Y remote window 106-s to which it maps, and the logical rules that the Net_X local mapping window 104-r applies in translating X protocol transaction requests to Y protocol transaction requests. Example implementations for maintaining and providing dynamic configuration for maintaining each X→Y map_r are described in greater detail at later sections.

It will be understood that the terms "local" and "remote" appearing in the example names "Net_X local mapping windows" 104 and "Net_Y remote windows" 106, respectively, are in relation to the X→Y mapping aspect of the FIG. 1 example DC multi-window X⇌Y bridge 100. In one aspect, one DC multi-window bridge according to one or more exemplary embodiments may also include a Y→X multiple mapping window aspect (not shown in FIG. 1) having windows that, from the perspective of the Y protocol network Net_Y, would be "Y-local," mapping to "X-remote" windows. As will be readily understood by persons of ordinary skill in the art upon reading this disclosure, one implementation of a Y→X mapping aspect may use example structures and methods described herein for the X→Y mapping aspect. For example, one Y→X multiple mapping window aspect may include a plurality of Y windows (not shown), each of the Y windows having a map arranged generally as the previously described X→Y map_r, but with a Y→X map.

Referring to FIG. 1, the example DC multi-window X⇌Y bridge 100 according to one exemplary embodiment has eight X windows and 16 Y windows or, stated differently, an example R=8 and S=16. These values of R and S are only examples, and as will be understood by persons of ordinary skill in the art from this disclosure, actual values of R and S may in part be a design choice, and may in part depend on the respective spans of the X and Y protocol address spaces.

In one aspect, the X→Y map_r associated with each Net_X local mapping window 104-r may be stored in one or more mapping window registers, such as the example mapping parameter (MPR) register set 108 shown in the FIG. 1 expanded view 150 of the Net_X local mapping window 104-1. It will be understood that the example MPR register set 108 depicted in the expanded view 150 may be representative of a comparable register set (not separately shown in FIG. 1) maintained for each of the other seven Net_X local mapping windows 104. With respect to examples of MPR register sets 108, one example may include an "X_LOCAL_WND_SPACE" register 108A storing the address space of the Net_Y local mapping window 106, an "X→Y_TRANSLATION_RULES" register 108B storing various X→Y translation rules, and a "Y_REMOTE_WND_SPACE" register 108C storing a parameter indentifying the Net_Y remote window 106-s to which the window maps. In one aspect, the dynamically configurable MPR register sets 108 may be maintained by, and dynamically configured by, or through, a protocol mapping controller function (not shown in FIG. 1).

It will be understood that the names "X_LOCAL_WND_SPACE," "X→Y_TRANSLATION_RULES" and "Y_REMOTE_WND_SPACE" have no inherent meaning, and that in practicing according to the embodiments any naming scheme may be applied to these and any other of the example parameters. It will also be understood that the dynamically configurable register sets MPR 108 may be implemented as, or within any storage means or method. It will likewise be understood that X_LOCAL_WND_SPACE" register 108A, the X→Y_TRANSLATION_RULES register 108B, Y_REMOTE_WND_SPACE" register 108C and "protocol mapping controller" are functions, and not necessarily indicative of any specific structure. For example, a "protocol mapping controller" may be implemented as functions distributed across various hardware devices and modules. In one aspect, structure hosting or embodying one of more of the dynamically configurable MPR register sets 108 may include portions of, or all of the protocol mapping controller functions.

Referring to FIG. 1, in one aspect the mapping window selection logic 102 may be configured to detect in the X protocol transaction requests received at the DC multi-window X⇌Y bridge 100 a destination or target address (not shown). Further, the mapping window selection logic 102 may be configured to identify, based on the detected destination address, the proper Net_X local mapping window 104 for that X protocol transaction request. In one example, the mapping window selection logic 102 may be configured to perform the identifying by determining if the destination address of the X protocol transaction request matches the X_LOCAL_WND_SPACE register 108A of the MPR register set 108 of any of the eight Net_X local mapping windows 104. Further to the example, if a match is found the X protocol transaction request may be mapped to the Net_Y remote window 106-s identified by the corresponding Y_REMOTE_WND_SPACE register 108C, according to the translation logic rules stored in the corresponding X→Y_TRANSLATION_RULES register 108B.

In one example, a mapping window selection block 102 may maintain and provide for dynamic configuration of pointers (not shown), each pointer associating an X protocol destination address, or range of destination addresses, to a particular Net_X local mapping windows 104. This is only one example, and not intended as any limitation on the scope of structure or methods for selecting a Net_X local mapping window 104 based on a destination address, or other parameter, of the X protocol transaction request. Various alternatives for such structure and methods will become apparent to persons of ordinary skill in the art from this disclosure, and from practicing according to the described embodiments.

Referring to FIG. 1, illustrative X→Y mapping window selections 110A, 110B, 110C (collectively referenced herein as "110"), are depicted, each being in response to the mapping window selection block 102 matching an X protocol destination address to the X_LOCAL_WND_SPACE register 108A of a Net_X local mapping window 104. Example X→Y mapping window selection 110A illustrates an X protocol destination address matching the X_LOCAL_WND_SPACE register 108A of Net_X local mapping window 104-1. The X→Y mapping window selection 110B represents an X protocol transaction request destination matching the X_LOCAL_WND_SPACE register 108A of Net_X local mapping window 104-2. The X→Y mapping window selection 110C represents an X protocol transaction request destination matching the X_LOCAL_WND_SPACE register 108A of Net_X local mapping window 104-7.

With continuing reference to FIG. 1, mapping 112A indicates a current content of the Y_REMOTE_WND_SPACE register 108C of Net_X local mapping window 104-1 maps X protocol transaction requests directed to that window to the Net_Y remote window 106-3. The Y-protocol transaction request (not specifically shown in FIG. 1) generated by the mapping 112A is in accordance with the translation logic rules currently stored in the X→Y_TRANSLATION_RULES register 108B of the Net_X local mapping window 104-1. Mapping 112B shows a current content of the Y_REMOTE_WND_SPACE register 108C of Net_X local mapping window 104-2 that maps X protocol transaction requests directed to that window to the Net_Y remote window 106-8, as a Y protocol transaction request according to the translation logic rules currently stored in the X→Y_TRANSLATION_RULES register 108B of the Net_X local mapping window 104-2.

Referring still to FIG. 1, mapping 112C indicates that a current content of the Y_REMOTE_WND_SPACE register 108C of Net_X local mapping window 104-7 maps X protocol transaction requests to the same Y-remote window 106-8 to which the Net_X local mapping window 104-2 is mapped. Mappings 112B and 112C illustrate one example of the various benefits provided by a DC multi-window X→Y bridge according to an exemplary embodiment, which is that by configuring multiple Net_X local mapping windows 104 to map X protocol transaction requests to the same Net_Y remote window 106, the X protocol network may be provided with the ability to select between different transaction request translation rules, simply by selecting destination address ranges for the X protocol transaction requests.

With respect to means for performing the X→Y translations represented by the X→Y mappings 112A, 112B, and 112C (collectively referenced hereinafter as "112"), in one example, a processing resource (not shown in FIG. 1) may retrieve from a memory (not specifically shown in FIG. 1) having the X→Y_TRANSLATION_RULES registers 108B associated with the each of the R Net_X local mapping windows 104, and then performs the X→Y translation accordingly. This is only one example, and examples of various alternative means are described in greater detail at later sections. Further, it will be understood that "processing resource" is intended to have no limitation as to hardware, technology, architecture or method, and encompasses a distributed processing resource or distributed processing capacity.

With respect to particular example X and Y protocols, it will be understood that one example DC multi-window X⇌Y bridge according to the exemplary embodiments may be configured to bridge any X and any Y protocol between which transaction requests or other messaging may wish to be communicated. As one illustration, one protocol X may be one of the Advanced Microcontroller Bus Architecture (AMBA) protocols, for example the Advanced eXtensible Interface (AXI) protocol, version AXI3 or AXI4 (collectively referenced as "AXI"). One example protocol Y may be RapidIO, for example Specification 1.3, 2.0, or 2.1, and may be either parallel RapidIO or Serial RapidIO (SRIO). RapidIO and all of its versions (including SRIO) are collectively referenced hereinafter as "RapidIO".

Figure 2:
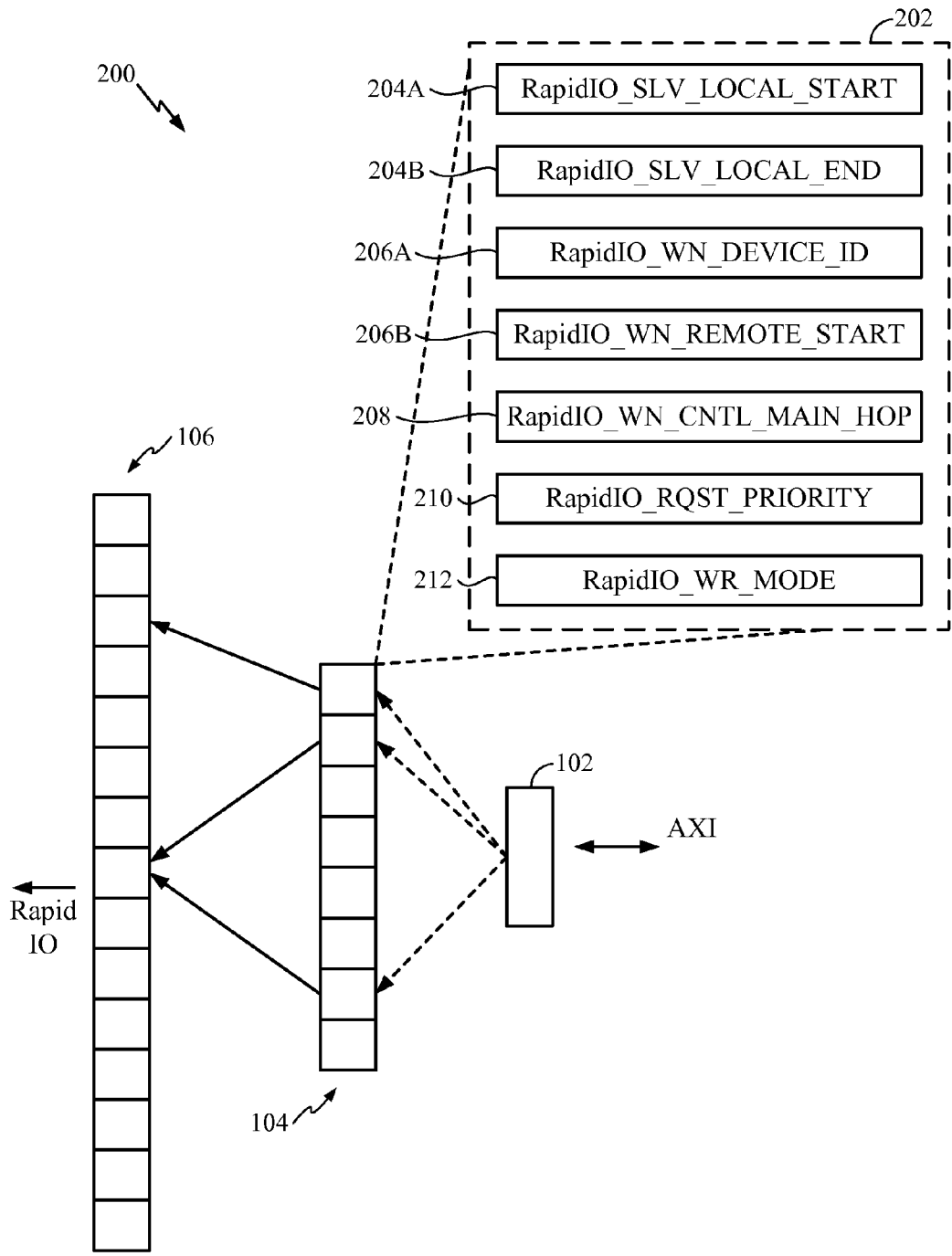
FIG. 2 is a high level logic block diagram for an illustrative protocol configuration of one dynamically configurable multi-window protocol mapping system according to one exemplary embodiment.

FIG. 2 shows one example configuration 200 of the FIG. 1 DC multi-window X⇌Y bridge 100, in which the R Net_X local mapping windows 104 are defined for an AXI-RapidIO mapping in accordance with the depicted example dynamically configurable (DC) AXI→RapidIO mapping window register set 202. The example DC AXI→RapidIO mapping window register set 202 may include a RapidIO slave window local start register (RapidIO_SLV_LOCAL_START) 204A and an RapidIO slave window local end (RapidIO_SLV_LOCAL_END) register 204B, defining the start and the end address boundary of the AXI. These may correspond to the FIG. 1 X_LOCAL_WND_SPACE register 108A. It will be understood that the names RapidIO_SLV_LOCAL_START and RapidIO_SLV_LOCAL_END, and all other parameter and register names used in describing the FIG. 2 example, are arbitrary, and that in practicing according to the embodiments any naming scheme may be applied to these and all other parameters described herein. It will also be understood that the RapidIO slave window local start register 204A and the RapidIO slave window local end register 204B, and all "registers" identified in reference to FIG. 2, are logic functions and not necessarily indicative of any specific structure.

Referring still to FIG. 2, the DC AXI→RapidIO mapping window register set 202 may, according to one aspect, provide for an AXI local window to be mapped to a RapidIO endpoint with a device ID. In one example according to this aspect, this RapidIO endpoint may be provided by a RapidIO_WN_DEVICE_ID register 206A and a RapidIO_WN_REMOTE_START register 206B. In one further example, AXI local windows may have the same size as the RapidIO windows. In such an example, the RapidIO_WN_REMOTE_START register 206B may be sufficient to define the RapidIO window boundary.

In another aspect, the DC AXI→RapidIO mapping window register set 202 may provide for an AXI window to be mapped to a RapidIO device without a device ID. As one illustration, this feature may be implemented as a RapidIO_WN_CNTL_MAINT_HOP register 208.

Since a RapidIO address space may be larger than an AXI address space and, in one aspect, RapidIO and AXI windows have the same span, the number of RapidIO windows may be greater than the number of AXI windows (e.g., there may be fewer FIG. 1 Net_X local windows 104 than Net_Y remote windows 106). In one aspect, the FIG. 2 DC AXI→RapidIO mapping window register set 202 for each of the AXI windows may be dynamically reprogrammed to map to different RapidIO windows at different parts of the RapidIO address space. A DC AXI→RapidIO mapping window register set 202 according to the one aspect may therefore, among other benefits, reduce or remove certain problems of having address spaces of unequal lengths in the two protocols to be bridged.

In one or more aspects, as will be described in greater detail below, DC AXI→RapidIO mapping window register sets 202 according to the exemplary embodiments may provide, among other features and benefits, dynamically configurable, selective utilization by AXI requests of features otherwise provided only by the RapidIO protocol.

As one example, it is known that RapidIO provides prioritization of transaction requests while AXI itself does not. In one aspect, though, one DC AXI→RapidIO mapping window register set 202 according to one exemplary embodiment may provide utilization, through AXI transaction request of the RapidIO priority levels. Referring to FIG. 2, in one example according to this aspect, a DC AXI→RapidIO mapping window register set 202 may include a RapidIO transaction request priority, or RapidIO_RQST_PRIORITY register 210. In one example, the RapidIO transaction priority to which AXI protocol transaction requests direct to the AXI window associated with the register 210 may be mapped. According to this aspect a user may program a plurality of AXI windows to map to the same RapidIO window, with each having a different RapidIO_RQST_PRIORITY register 210 state. As will be understood, this may provide for selective mapping AXI transaction requests to RapidIO transaction requests of a desired priority or given priority, or given priority level, by simply directing the AXI transaction request to the AXI window having a RapidIO_RQST_PRIORITY register 210 state corresponding to the desired or given priority.

As another example, it is known that RapidIO provides various response modes for transaction requests, including modes in which the sender of a transaction request does not require a response, while AXI itself does not provide such modes. Instead, AXI generally requires that transaction requests receive a response. In one aspect, though, DC AXI→RapidIO mapping window register sets 202 according to various exemplary embodiments may remove certain impediments that may arise from this disparity. For example, DC AXI→RapidIO mapping window register sets 202 according to exemplary embodiments may include a RapidIO response mode register, for example the FIG. 2 depicted RapidIO_WR_MODE register 212, with a dynamically configurable setting of the RapidIO response mode. In one aspect, dynamically configurable settings for the RapidIO_WR_MODE register set 212 may include, for example, a normal mode, a fast response mode, and a coherency mode.

As one example according to a dynamically configurable response mode aspect, one setting of the RapidIO_WR_MODE register 212 may indicate a "normal mode." In one example "normal mode," all bufferable AXI writes may be translated into RapidIO writes without responses, and AXI responses may be turned around immediately Non-bufferable AXI writes are translated into RapidIO writes with responses, AXI responses are derived from the RapidIO responses As another example according to a dynamically configurable response mode aspect, one setting of the RapidIO_WR_MODE register 212 may indicate a "fast response." In one example fast response mode, both bufferable and non-bufferable AXI writes may be translated into RapidIO writes without responses. To conform to the AXI requirement for responses to writes, in one aspect a dynamically configurable multiple mapping window AXI⇆RapidIO bridge according to one exemplary embodiment may be configured to manufacture the required AXI response and send it immediately back to the AXI, without waiting for RapidIO responses to come back, as will be described in greater detail at later sections.

Referring still to FIG. 2, in another example of a dynamically configurable response mode aspect, one setting of the RapidIO_WR_MODE register 212 may indicate a "coherency mode." In one "coherency mode," both bufferable and non-bufferable AXI writes are translated into RapidIO writes with responses, AXI responses are derived from RapidIO responses. As will be understood this may result in slower processing of transaction request processing but may be required for certain applications.

Figure 3:
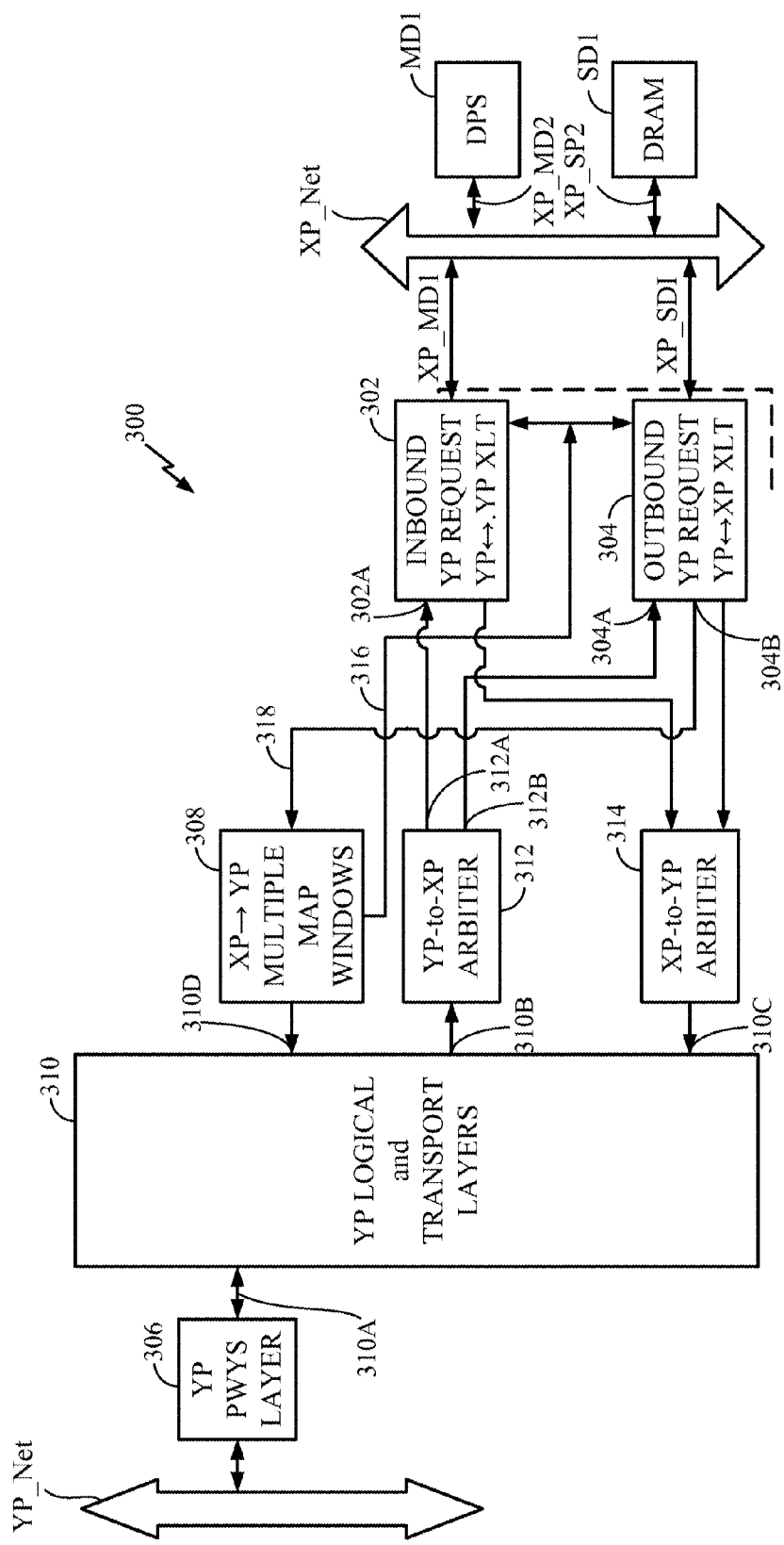
FIG. 3 shows a functional block schematic of one example dynamically configurable multiple mapping window bridge according to one exemplary embodiment.

FIG. 3 shows a functional block schematic of one dynamically configurable (DC) multiple mapping window XP⇆YP bridge 300 according to one exemplary embodiment. The FIG. 3 depicted example environment includes an XP protocol interconnect XP_Net and a YP protocol interconnect YP_Net. It will be understood that the names "XP" and "YP" are arbitrary, having no intended inherent meaning, and no intended reference to any particular protocol or type of protocol. It will be understood that either or both of the XP_Net and the YP_Net may be multi-layer, and that either or both may include non-XP or non-YP protocol networks not visible at their interface with the DC multiple mapping window XP⇆YP bridge 300.

Referring to FIG. 3, for purposes of illustrating concepts, the example DC multiple mapping window XP⇆YP bridge 300 is shown in a configuration for master-slave XP and YP protocols. Persons of ordinary skill in the art, though, upon reading this disclosure, can readily adapt the example DC multiple mapping window XP⇆YP bridge 300 to practice the exemplary embodiments with protocols other than master-slave. For purposes of describing example operations, one example XP master device MD1, e.g., a data processor, coupled to a master port XP_MP2 and one example XP slave device SD1, e.g., a DRAM, coupled to a slave port XP_SP2 of the XP_Net are shown. It will be understood that more than one master device and more than one slave device may be coupled to the XP_Net.

Referring still to FIG. 3, for interfacing to the XP_Net, the example DC multiple mapping window XP⇆YP bridge 300 may include an inbound YP request YP⇆XP translation (XLT) block 302 and an outbound XP Request YP⇆XP XLT block 304. The inbound YP Request YP⇆XP XLT block 302 may have a physical layer (not explicitly shown) coupling as an XP master port XP_MP1 to the XP_Net, and the outbound XO request YP⇆XP XLT block 304 having a physical layer (not explicitly shown) that implements an XP slave port XP_SP1 to the XP_Net. For interfacing to the YP_Net, a YP physical layer 306 may be provided.

It will be understood that the term "inbound" in the context of "inbound YP request YP⇆XP XLT" block 302 is used because, in the FIG. 3 example DC multiple mapping window XP⇆YP bridge 300, the inbound YP request YP⇆XP XLT performs translation, both XP→YP and YP→XP for communication of packets in association with YP transaction requests that originate in the YP_Net and, hence, are "inbound" from the perspective of the XP_Net. Similarly, the term "outbound" in the context of "outbound XP request YP⇆XP XLT" block 304 is used because that block performs translation, both XP→YP and YP→XP for communication of packets in association with XP transaction requests that originated in the XP_Net and, hence, are "outbound" from the perspective of the XP_Net. More specifically, the inbound YP Request YP⇆XP XLT block 302 may perform YP→XP translation of YP transaction requests originally received from the YP_Net at the YP physical layer 306, and may perform XP→YP translation of the XP responses, e.g., from the slave device SD1, to such inbound YP transaction requests. Likewise, the outbound XP Request YP⇆XP XLT block 304 may perform XP→YP translation of XP transaction requests that it receives from the XP_Net, e.g., from the master device XP_MD1, and may perform YP→XP translation of YP responses, e.g., from a YP device (not shown), to such XP transaction requests. Further, as will be described in greater detail below, the outbound XP Request YP⇆XP XLT block 304 may be configured such that upon receiving XP transaction requests from, for example, the master device XP_MD1, it will access a multiple XP→YP mapping window registry or register 308 to associate that XP transaction request with a particular XP→YP mapping window, and then perform the XP→YP translation of that XP transaction request in accordance with the associated window.

Referring still to FIG. 3, as previously described the YP physical layer 306 may couple the DC multiple mapping window XP⇆YP bridge 300 to the YP_Net. The YP physical layer 306 interface with the YP_Net does not show a master and a slave port, but it will be understood that, in one aspect, the YP physical layer 306 may support, for example, either peer-to-peer or master-slave transactions, or both. The YP physical layer 306 may couple the YP_Net to a YP input/output (I/O) 310A of YP logical and transport layers 310. In one aspect, the YP logical and transport layers 310 may also include certain control for the YP physical layer. The YP logical and transport layer 310 may perform logical and transport layer operations on YP protocol packets received at the YP I/O 310A, and then output corresponding YP internal packets (not explicitly shown) from a YP-to-XP output 310B. In one aspect, the multiple XP→YP mapping window register 308 may provide control parameters for the YP logical and transport layer 310 and, further to this aspect, such control parameters for the YP logical and transport layer 310 may be included in each particular XP→YP mapping window in the multiple XP→YP mapping window register 308. In addition, in one aspect control parameters (not explicitly shown) for the YP physical layer 306 may be included in each particular XP→YP mapping window in the multiple XP→YP mapping window register 308.

The YP-to-XP output 310B may couple to an input (shown but not separately numbered) of a YP-to-XP arbiter 312. With respect to the specific processing performed by the YP logical and transport layer 310, as will be understood by persons of ordinary skill in the art pertaining to the embodiments upon reading this disclosure, that specific processing as well as the specific format of the "YP internal packets" will be particular to the YP protocol in which the embodiment is practiced. With respect to structures for the YP logical and transport layer 310, such persons can readily identify and implement one or more structures and methods, by combining the knowledge of logical and transport layer processing for the selected YP protocol that such persons possess with this disclosure.

Referring to FIG. 3, in one aspect, the YP-to-XP arbiter 312 may be configured with an output 312A and an output 312B, and may be configured to differentiate between, on one hand, YP protocol transaction request packets received from the YP_Net and, on the other hand, YP protocol packets received from the YP_Net in response to XP protocol requests. Further to this aspect, the YP-to-XP arbiter 312 may be configured to send detected YP protocol transaction request packets via output 312A to the I/O 302A of the inbound YP Request YP⇆XP XLT block 302, and to send detected YP protocol response packets via output 312B to the I/O 304A of the outbound XP Request YP⇆XP XLT block 304.

With continuing reference to FIG. 3, the example YP logical and transport layer 310 may have an XP-to-YP input 310C receiving an output (shown but not separately numbered) of an XP-to-YP arbiter 314. The YP internal packets received at the XP-to-YP input 310D of the YP protocol logical and transport layers 310 may have been translated into YP protocol by, for example, the inbound YP Request YP⇆XP XLT block 302 or by the outbound XP request YP⇆XP XLT block 304. In one example, the outbound XP Request YP⇆XP XLT block 304 will have performed the translation if the YP internal packet was originally an XP protocol transaction request sent by, for example, the master device XP_MD1. On the other hand, the inbound YP Request YP⇆XP XLT block 302 may have performed the translation if the YP internal packet was originally an XP protocol response sent by, for example, the XP slave device XP_SD1 in response to a YP protocol transaction request received originally at the YP physical layer 306.

As previously described, the example DC multiple mapping window XP⇆YP bridge 300 may include a multiple XP→YP mapping window register 308 that may store a plurality of XP→YP mapping register sets (not explicitly shown in FIG. 3), each defining an XP→YP mapping window. Each of the XP→YP mapping register sets may, for example, be according to one of the previously described example MPR register sets 108. In one example, there may be R of such XP→YP mapping register sets, and each may define one of R XP→YP mapping windows, such as one of the previously described example Net_X local XP→YP mapping windows 104, e.g., each defining the mapping window's address space in the XP protocol, the mapping window's address space in the YP protocol, and various XP→YP translation rules.

Referring still to FIG. 3, provision for selecting from among the R XP→YP mapping window in the multiple XP→YP mapping window register 308, and for using the parameters defining the selected XP→YP mapping window in translating packets, a translation configuration logical path 316 may couple the multiple XP→YP mapping window register 308 to the inbound YP Request YP⇆XP XLT block 302 and to the outbound XP Request YP⇆XP XLT block 304. Further to this one aspect, the outbound XP Request YP⇆XP XLT block 304 may include a mapping window access output 304B that, for example, through mapping window access path 318, may provide the destination address of an XP protocol transaction request to the multiple XP→YP mapping window register 308. In one further aspect, the multiple XP→YP mapping window register 308 may be configured to identify which of its stored XP→YP mapping windows, e.g., which of the FIG. 1 example Net_X local mapping windows 104, matches the destination address. Further to this aspect, the multiple XP→YP mapping window register 308 may be configured to provide the translation rules defining the identified matching XP→YP mapping window to the inbound YP Request YP⇆XP XLT block 302 and the outbound XP Request YP⇆XP XLT block 304, for the use in translating the XP packet to a YP internal packet, as described in greater detail at later sections.

Figure 4:
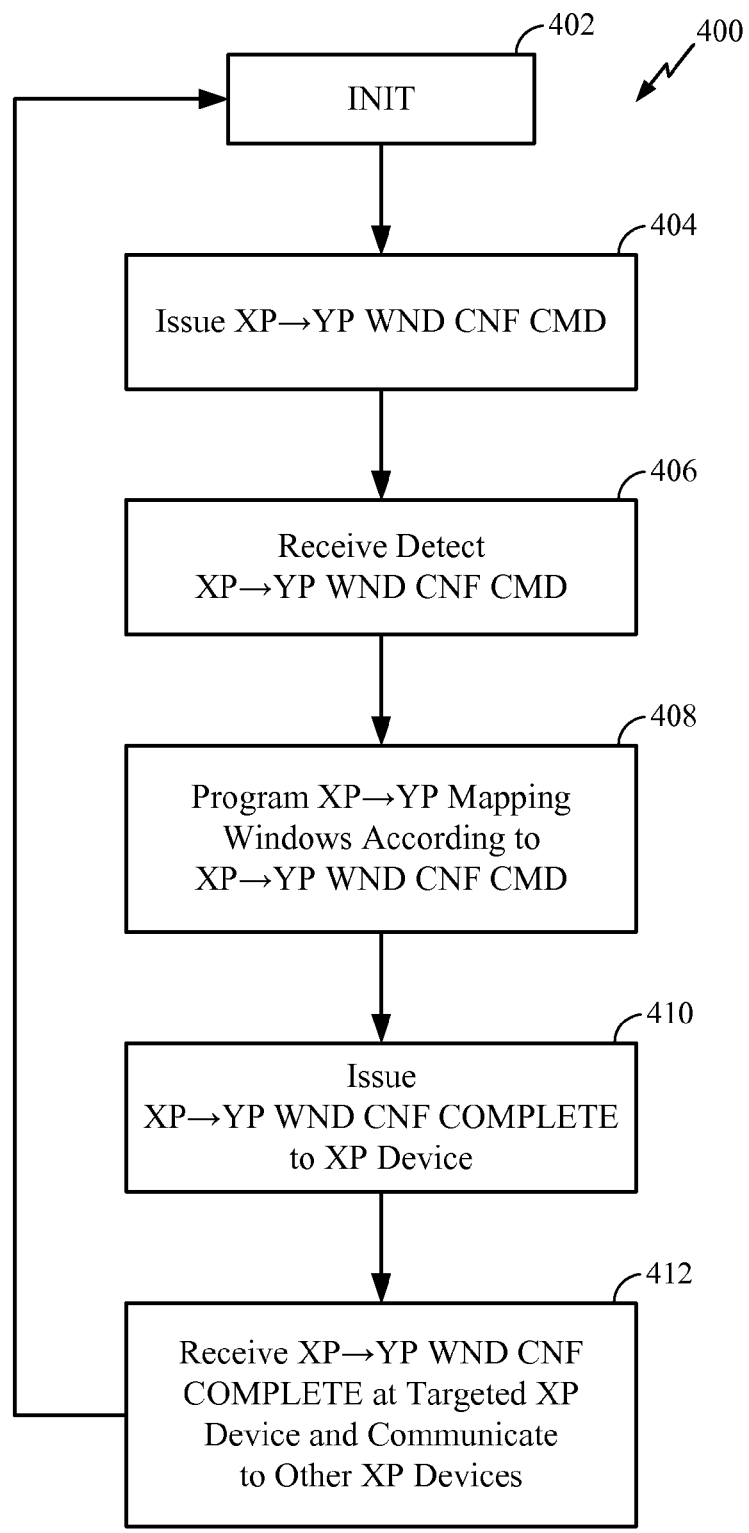
FIG. 4 shows a logic flow of one example of configuring mapping windows in one dynamically configurable multiple mapping window bridge according to one exemplary embodiment.

FIG. 4 shows a logical process flow in one example programming process 400 for configuring XP→YP mapping windows of one dynamically configurable multiple mapping window bridge according to one exemplary embodiment. Certain assumptions will be understood in reading the description referencing FIG. 4. One is that although the FIG. 4 example programming process 400 is described referencing the FIG. 3 example DC multiple mapping window XP⇆YP bridge 300, programming of protocol-to-protocol mapping windows according to the embodiments may be practiced on any system providing the embodiments' programmable multiple mapping windows, irrespective of the system's architecture as compared to the FIG. 3 example. In addition, the FIG. 4 example configuring 400 is described as configuring the FIG. 3 example multiple XP→YP mapping window register 308. However, it will be understood that the FIG. 3 multiple XP→YP mapping window register 308 is not necessarily a single "register" in a hardware sense and, instead, may represent a distributed storage and maintenance of the various parameters defining an XP→YP mapping window. Therefore, it will be understood that description of, for example, "accessing the multiple XP→YP mapping window register 308," encompasses all equivalent accessing and, if required, setting the state(s) of one or more of various distributed parameters defining the XP→YP mapping window.

Further regarding the certain assumptions to be understood when reading the description referencing FIG. 4, example operations of the process may be described as being performed by an administrator within the XP_Net, e.g., a suitably authorized mode of the XP protocol master device XP_MD1. However, as will be apparent to persons of ordinary skill in the art from this disclosure, such persons can readily adapt the described example programming 400 to an implementation in which a YP protocol administrator (not shown) performs the configuring operations. In addition, the FIG. 4 example configuring 400 is described as performed through the regular data paths (e.g., through the master port MP1 and slave port SP1) to the XP_Net. It will be understood that this is only one example means and, as will be readily understood by persons of ordinary skill in the art upon reading this disclosure, various alternate means for configuring multiple XP→YP mapping windows may be used. As one illustration, configuring multiple XP→YP mapping windows equivalent to the FIG. 4 example configuring 400 may be performed by one or more of the various side-band channel means, for example side channels used in messaging between nodes within certain known networks.

It will also be understood that the FIG. 4 example configuring process 400, although described in reference to XP→YP mapping windows, is not intended as any limitation on the scope of any of the exemplary embodiments, or on any aspect of any embodiment. Instead, as previously described, the exemplary embodiments contemplate bi-directional DC multiple mapping window XP⇆YP bridges. Persons of ordinary skill in the art, upon reading the present disclosure, will be able to readily adapt the concepts described in reference to programming the XP→YP mapping windows to programming YP→XP mapping windows.

Referring now to FIG. 4, one example XP→YP mapping window programming process 400 may begin at a start or initial state 402. One example start state is an off or "sleep" state of a DC multiple mapping window XP⇆YP bridge according to one or more exemplary embodiments, e.g., a system or apparatus that stores and applies parameters defining multiple XP→YP mapping windows. Initial state 402 may be a DC multiple mapping window XP→YP bridge according to one or more exemplary embodiments operating in a given configuration of its XP→YP mapping windows. At 404, in response to, for example a start-up or one of certain program instructions, a device such as the master device XP_MD1 issues XP→YP window configuration commands, or "XP→YP WND CNF CMDs" that may be targeted to a specific address associated with the XP→YP mapping windows. As one example for 404, referring to FIG. 3 the master device XP_MD1 may issue the XP→YP WND CNF CMD, addressed to the slave port XP_SP1. Upon detecting the XP→YP WND CNF CMD at 406 the programming process 400 may go to 408 and perform programming of one or more of the XP→YP mapping windows in accordance with the XP→YP WND CNF CMD.

With continuing reference to FIG. 4, as will be understood by persons of ordinary skill in the art some protocols (e.g., AXI) that may be used as the XP protocol may require a response to transaction requests, or to messaging if messaging is used in 404. For such protocols, after the programming at 408 the process 400 may go to 410 and transmit the required response back to the XP device used at 404. For example, referring to FIG. 3, if the master device XP_MD1 issued the XP→YP WND CNF CMD at 404 then, at 410, logic within the DC multiple mapping window XP⇆YP bridge 300 may issue the response, e.g., an "XP→YP WND CNF COMPLETE," that may be targeted, for example, to the XP device that issued the XP→YP WND CNF CMD at 404. In one aspect, the targeted XP device, upon receiving the XP→YP WND CNF COMPLETE AXI, may at 412 communicate the completion to other devices on the XP_Net. The programming process 400 may then return to the initial state 402.

With respect to the particular format for the X_WND_CNF_CMD issued at 404 this may be, in part, a design choice. Factors in the design choice may include, for example, conformance with the XP protocol in which the embodiment is being practiced, and the arrangement used for the FIG. 3 multiple XP→YP mapping window register 308 selected to store the parameters defining the XP→YP mapping windows. For example, the X_WND_CNFG_CMD format may be one or more packets, and each may have a field (not explicitly shown) identifying the packet as an XP window programming command, a field identifying an $m^{th}$ one of the XP→YP mapping windows, a field identifying, for example the XP address space of the $m^{th}$ XP→YP mapping window, a field identifying the YP address space to which the $m^{th}$ XP→YP mapping window will map, and one or more fields identifying the XP→YP translation rules for the $m^{th}$ XP→YP mapping window. It will also be understood that these are only examples of an XP→YP programming packet format and that persons of ordinary skill in the art may identify multiple packet methods for carrying out the programming block 504 upon reading this disclosure or upon practicing according to the described embodiments.

Referring to FIG. 4, in one aspect 404 may include a default window configuration feature in which a master device (e.g., XP_MD1), or other device, may issue a "reset" or "set to default" type of command causing all of the multiple mapping window register 308 to assume a default state. In another aspect, 404 may include the master device XP_MD1, or other device issuing XP window configuration commands to selectively configure (or reconfigure) certain ones of XP→YP mapping windows.

It will be understood that the above-described process 400 for programming one or more of the multiple XP→YP mapping windows in a DC multiple mapping window XP⇆YP bridge according to the exemplary embodiments is only one example, and is not intended to limit the scope of any of the embodiments or of any aspect of any embodiment. In one aspect, one or more embodiments provide for a YP device to program one or more of the multiple XP→YP mapping windows, utilizing the YP port of the DC multiple mapping window XP⇆YP bridge. In another aspect, a DC multiple mapping window XP⇆YP bridge according to the exemplary embodiments may be configured to utilize a sideband (not shown in the figures) for programming one or more of the multiple XP→YP mapping windows, as opposed to the regular data paths (e.g., the XP_Net) or regular ports (e.g., XP_MP1 or XP_SP1) to the DC multiple mapping window XP⇆YP bridge.

Figure 5:
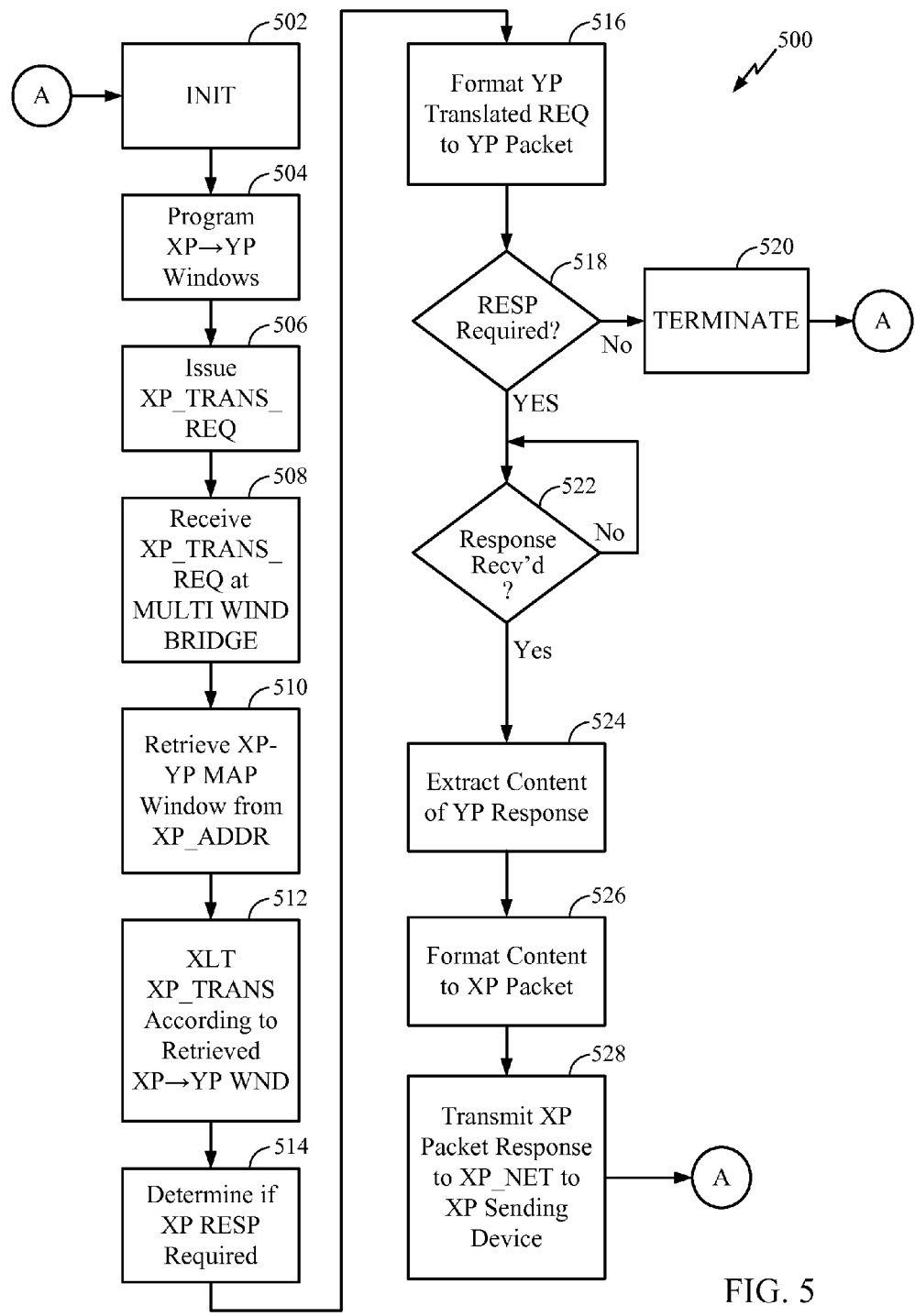
FIG. 5 shows a logic flow in one transaction process through one example multiple mapping window bridge of one dynamically configurable multi-window protocol mapping system according to one exemplary embodiment.

FIG. 5 shows a logical process flow of one transaction process 500 for one example configured multiple mapping window bridge according to one exemplary embodiment. It will be understood that although the FIG. 3 example DC multiple mapping window XP⇆YP bridge 300 is referenced as one example environment in describing certain features of the transaction process 500, that this is not intended to limit any of the exemplary embodiments, or any aspect of any exemplary embodiments, to that only FIG. 3 environment.

Instead, methods according to the exemplary embodiments may be practiced on any system or system environment capable of supporting the methods as described and claimed. Further, the transaction process 500 is described in reference to XP→YP mapping windows but, as previously described, the exemplary embodiments contemplate bi-directional DC multiple mapping window XP⇌YP bridges. Persons of ordinary skill in the art, upon reading the present disclosure, will be able to readily adapt the concepts to practices of the exemplary embodiments having, and using multiple YP→XP mapping windows.

Referring to FIG. 5, the transaction process 500 may begin at a starting state 502 that may, for example, be any state of a DC multiple mapping window XP⇌YP bridge according to the present embodiment. In one example, at 504 an entity such as the master device XP_MD1 connected to the XP_Net of FIG. 3 may perform a window programming process according to, for example, the FIG. 4 example window programming process 400. It will be understood that the window programming process 504 may be omitted in instances where the desired configuration for the multiple XP→YP mapping windows is already in place.

Referring to FIG. 5, it will be assumed for one example that the window programming process at 504 may configure two XP→YP mapping windows, each defined by an MPR register set 108 described in reference to FIG. 1. In one example this may be performed using two respective X_WND_CNFG_C-MDs. It will be assumed for the example that the two X_WND_CNFG_CMDs configured both of the two XP→YP mapping windows to map to the same YP window, and that the XP→YP translation rules are such that a first of the XP→YP mapping windows translates the XP transaction request to a high priority YP transaction request and a second of the XP→YP mapping windows translates the XP transaction request to a low priority YP transaction request.

Referring still to FIG. 5 and continuing with the example in which two of the XP→YP mapping windows are programmed at 504, the process 500 may then go to 506 where, for example, the FIG. 3 master device MD1, issues an XP protocol transaction request. The XP protocol transaction request generated at 506 will be referenced herein as XP_Transaction_Request, and may be a packet routable within the XP_Net. It will be assumed that the XP_Transaction_Request has an XP protocol destination address, referenced herein as "XP_Transaction_Request(XP_ADDR)." A payload, if any is associated with the XP_Transaction_Request, may be assumed as being a portion of that TRN-Command. According to one aspect it will also be assumed that the XP_Transaction_Request has a field identifying the XP device from which it issued, e.g., the master device MD1.

Referring still to FIG. 5, it will be assumed for describing one example that the XP_Transaction_Request issued at 506 has an XP_Transaction_Request(XP_ADDR) that matches one of the two XP→YP mapping windows described as being programmed at 504. As previously described, the XP_Transaction_Request is assumed routable within the XP_Net, and therefore at 508 the XP_Transaction_Request issued at 506 may be received by a DC multiple mapping window XP⇌YP bridge according to the exemplary embodiments. For illustration, if the process 500 is being performed in association with the FIG. 3 example DC multiple mapping window XP⇌YP bridge 300 then, at 508, the XP_Transaction_Request issued at 506 may be received through the slave port SP1 of its outbound XP Request YP⇌XP XLT block 304. The process 500 may then go to 510 where the DC multiple mapping window XP⇌YP bridge may retrieve the XP→YP translation rules defining the XP→YP mapping window to which the XP_Transaction_Request is directed. For example, the retrieving of the XP→YP translation rules at 510 may include inspecting and matching the XP_Transaction_Request(XP_ADDR) to the XP address space defined for one of the XP→YP mapping windows. Referring to the FIG. 3 example DC multiple mapping window XP⇌YP bridge 300, the retrieval at 510 may be performed by the outbound XP Request YP⇌XP XLT block 304 accessing the multiple XP→YP mapping window register 308 through the mapping window access path 318, and obtaining the translation parameters for the associated XP→YP mapping window through the translation configuration logical path 316.

Referring still to FIG. 5, after retrieving the XP→YP translation rules at 510 the transaction process 500 may go to 512 where the XP_Transaction_Request may be translated to a YP protocol transaction request, according to the retrieved XP→YP translation rules. Referring to the FIG. 3 example DC multiple mapping window XP⇌YP bridge 300, the XP→YP translation at 512 may be performed by the outbound XP Request YP⇌XP XLT block 304. In one aspect, the transaction process 500 may, for example depending on the type of XP_Transaction_Request and the XP→YP translation rules of the selected XP→YP mapping window, determine that the issuing device (e.g., the master device XP_MD1) does not require a response to the XP_Transaction_Request. In one example, determination of whether a response is required may be represented as logic block 514. The transaction process may then go to 516 where the YP transaction request generated by the XP→YP translation at 512 may be formatted into the YP protocol and transmitted into the YP_Net. For example, if the transaction process 500 is performed on the FIG. 3 example DC multiple mapping window XP⇌YP bridge 300, the formatting and transmittal at 514 may include the YP request packets passing from the outbound XP Request YP⇌XP XLT block 304 to the XP-to-YP arbiter 314, then via the XP-to-YP input 310C to the YP logical and transport layer block 310, then from the YP I/O 310A of the YP logical and transport layer block 310 to the YP physical layer 306, and then toward the targeted YP device. As previously described in reference to FIG. 1, the address of the targeted YP device may be in a register, e.g., Y_REMOTE_WND_SPACE" register 108C, of the MPR register set 108 defining the XPYP window used by the outbound XP Request YP⇌XP XLT block 304 in its translating of the XP transaction request.

Referring still to FIG. 5, after 516 the transaction process may go to 518 where, if the determination at 514 indicated that no response was required then, as depicted, the transaction process may go to 520 where it terminates, and then return to the initial state 502. If the determination at 514 was that a response was required then the process goes from 518 to 522 where it waits for the response, which will be referenced herein as "YP_Response_to_XP_TR." Next, when the YP_Response_to_XP_TR is received at 522, the transaction process 500 may go to 524 where the content of the YP_Response_to_XP_TR, may be extracted to obtain what will be referenced as YP_Response_to_XP_TR(Content). The transaction process 500 may then go to 526 where the YP_Response_to_XP_TR(Content) may be formatted into an XP protocol packet and then to 528 where the XP formatted packet having the YP_Response_to_XP_TR(Content) may be transmitted back to the XP protocol entity that sent the original XP request requiring the response. The transaction process 500 may then return to the initial state 502.

Referring to FIGS. 3 and 5 together, in performing the example the FIG. 3 transaction process 500 on the FIG. 5 example DC multiple mapping window XP⇌YP bridge 300, the YP_Response_to_XP_TR received at 524 may enter through the YP physical layer 306, then pass through the YP logical and transport layer 310 to the YP-to-XP arbiter 312. As previously described, the YP-to-XP arbiter 312 may be configured to differentiate between YP transaction and requests YP responses to XP transaction requests and, accordingly, may detect this example YP_Response_to_XP_TR and route it from output 312B to the outbound XP Request YP⇌XP XLT block 304. The outbound XP Request YP⇌XP XLT block 304 may then perform YP→XP translation, format the translation result into an XP packet and transmit it to the XP_Net, which routes it to the MD1 that issued the request at 504.

The transaction process 500 is described above in reference to an XP transaction request issued by the XP master device MD1. In one example DC multiple mapping window XP⇌YP bridge 300 multiple YP→XP mapping windows may be omitted and, in such a case YP originated transaction requests may processed in accordance with a conventional fixed configuration XP⇌YP bridge. For example, referring to FIG. 3, a YP transaction request may be received at the YP physical layer 306 then passed from the YP I/O 310A of the YP logical and transport layer 310 to the YP-to-XP port 310B to the YP-to-XP arbiter 312. The YP-to-XP arbiter 312, as previously described, may be configured to detect this YP transaction request and, in response, route it to the inbound YP Request YP⇌XP XLT block 302. The inbound YP Request YP⇌XP XLT block 302 may, in turn perform YP→XP translation, convert the translated XP transaction request to an XP packet and send it to the XP_Net. The YP_Net may and route this to the slave port SP2 where it may be received by the DRAM. The DRAM may send the XP response (e.g., a data read from the DRAM) to the XP_Net, targeted to the MP1 port, where it may be received by the master port of the inbound YP Request YP⇌XP XLT block 302. The inbound YP Request YP⇌XP XLT block 302 may then send this to the XP-to-YP arbiter 314, which then passes it through the YP logical and transport layer 310 for formatting as a YP packet. The YP packet is then passed from the YP I/O 310A to the YP physical layer 306 and then to the YP_Net to the RapidIO device (not shown) that issued the original YP transaction request.

Figure 6:
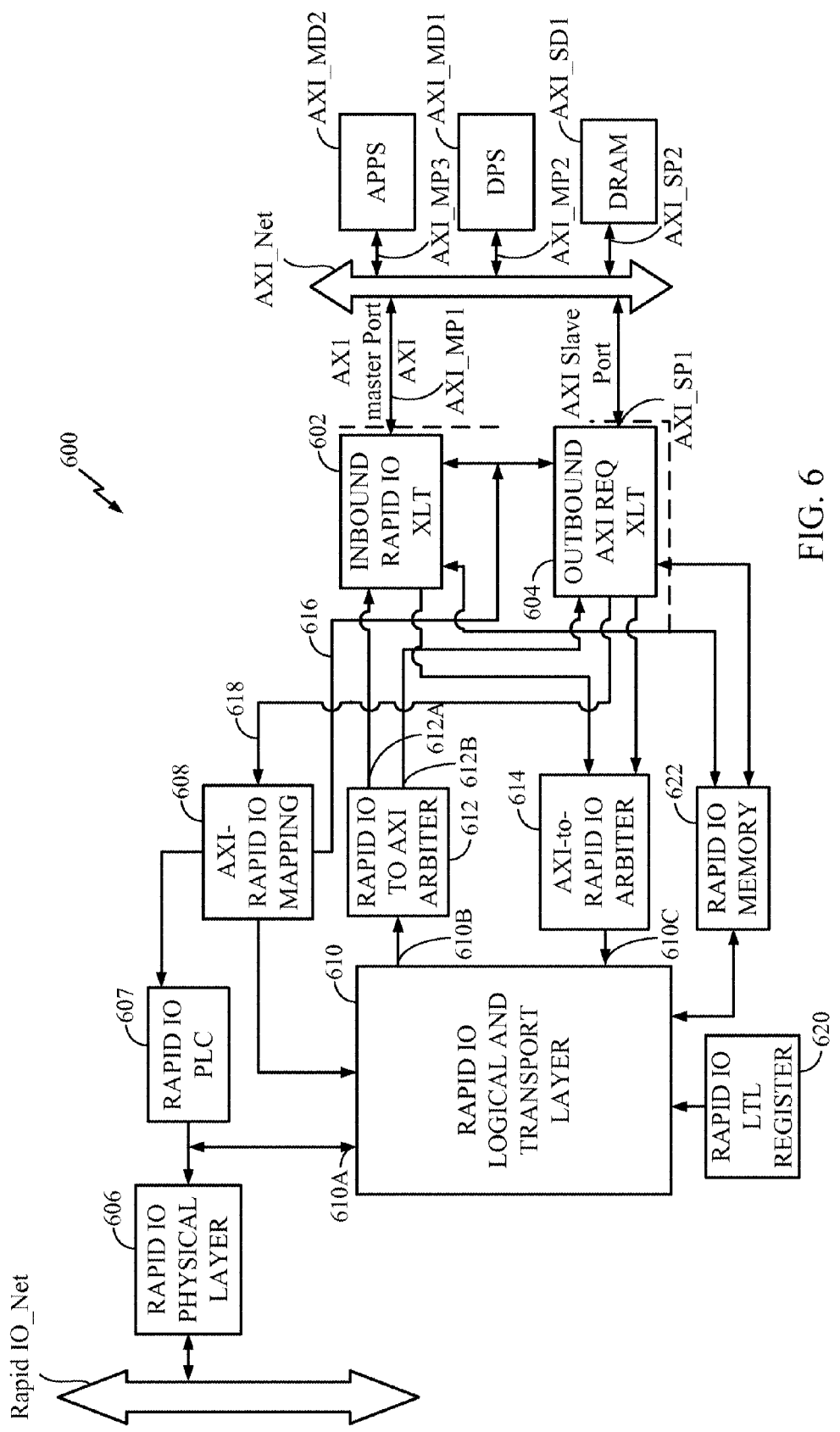
FIG. 6 shows a functional block schematic of one example dynamically configurable multiple mapping window bridge, bridging example protocols according to one exemplary embodiment.

FIG. 6 shows a functional block schematic of one dynamically configurable (DC) multiple mapping window AXI⇌RapidIO bridge 600 according to one exemplary embodiment. The FIG. 6 depicted example environment includes an AXI protocol network or interconnect AXI_Net and a RapidIO network or interconnect RapidIO_Net. DC multiple mapping window AXI⇌RapidIO bridge 600 may include an inbound RapidIO request AXI⇌RapidIO translation(XLT) block 602 and an outbound AXI request AXI⇌RapidIO translation block 604. The inbound RapidIO request AXI⇌RapidIO XLT block 602 may have a physical layer (not explicitly shown) that implements an AXI master port AXI_MP1 coupling to the AXI_Net. The outbound AXI request AXI⇌RapidIO XLT block 604 may have a physical layer (not explicitly shown) that implements an AXI slave port AXI_SP1 coupling to the AXI_Net. In one example, the inbound RapidIO request AXI⇌RapidIO XLT block 602 may perform AXI⇌RapidIO translation of RapidIO transaction requests originally received from the RapidIO_Net at the RapidIO physical layer 606, and may perform AXI→RapidIO translation of AXI responses, e.g., from the slave device AXI_SD1, to the RapidIO transaction requests.

Referring to FIG. 6, in one aspect the outbound AXI request AXI⇌RapidIO XLT block 604 may be configured such that upon receiving AXI transaction requests from, for example, the master device AXI_MD1 or AXI_MD2, it will access a multiple AXI→RapidIO mapping window register 608 to associate that AXI transaction request with a particular AXI→RapidIO mapping window, and then perform the AXI→RapidIO translation of that AXI transaction request in accordance with the associated window. The multiple AXI→RapidIO mapping window register 608 may store window a DC AXI→RapidIO mapping register set 202 as described in reference to FIG. 2 for each of the AXI→RapidIO mapping window.

Referring still to FIG. 6, the RapidIO physical layer 606 coupling the DC multiple mapping window AXI⇌RapidIO bridge 600 to the RapidIO_Net does not show a master and a slave port, but it will be understood that the RapidIO physical layer 606 may support, for example, either peer-to-peer or master-slave transactions, or both. The RapidIO physical layer 606 may, in turn, couple to a RapidIO input/output (I/O) 610A of a RapidIO logical and transport layer 610. In one aspect, the multiple AXI→RapidIO mapping window register 608 may provide RapidIO physical layer control parameters (not explicitly shown) to a RapidIO physical layer controller (PLC) 607, and to the RapidIO logical and transport layer 610. Further to this aspect, RapidIO physical layer control parameters and control parameters for the RapidIO logical and transport layer 610 may be included in the DC AXI→RapidIO mapping register set 202 for each of the AXI→RapidIO mapping windows.

Referring to FIG. 6, the RapidIO logical and transport layer 610 may perform logical and transport layer operations on RapidIO protocol packets received at the RapidIO I/O 610A, and then output corresponding RapidIO internal packets (not explicitly shown) from a RapidIO-to-AXI output 610B that, in turn, may couple to an input (shown but not separately numbered) of a RapidIO-to-AXI arbiter 612. With respect to structures for the RapidIO logical and transport layer 610, persons of ordinary skill in the art can readily identify one or more structures and methods, by combining the knowledge of logical and transport layer processing for RapidIO that such persons possess with this disclosure.

Referring still to FIG. 6, in one aspect, the RapidIO-to-AXI arbiter 612 may be configured to differentiate between, on one hand, RapidIO transaction request packets received from the RapidIO_Net and, on the other hand, RapidIO packets received from the RapidIO_Net in response to AXI protocol requests. Further to this aspect the RapidIO-to-AXI arbiter 612 may be configured to route detected RapidIO transaction request packets via an output 612A to an input (shown but not separately numbered) of the inbound RapidIO Request AXI⇌RapidIO XLT block 602, and to route detected RapidIO response packets via its output 612B to the outbound AXI request AXI⇌RapidIO XLT block 604.

With continuing reference to FIG. 6, the example RapidIO logical and transport layer 610 may have a RapidIO-to-AXI input 610C coupled to an output (shown but not separately numbered) of an AXI-to-RapidIO arbiter 614. The RapidIO internal packets received at the AXI-to-RapidIO input 610C of the RapidIO logical and transport layer 610 may have been translated into RapidIO by, for example, the AXI⇌RapidIO inbound request XLT block 602 or by the AXI⇌RapidIO outbound request XLT block 604. In one example, the inbound RapidIO AXI⇌RapidIO request XLT block 602 will have performed the translation if the RapidIO internal packet was originally an AXI transaction request sent by, for example, one of the master devices AXI_MD1 or AXI_MD2. Further, in one example the outbound AXI request AXI⇌RapidIO XLT block 604 may have performed the translation if the RapidIO internal packet was originally an AXI protocol response sent by, for example, the AXI slave device AXI_SD1 in response to a RapidIO protocol transaction request received originally at the RapidIO physical layer 606.

With respect to the AXI→RapidIO multiple mapping window register 608, this may in one example store a plurality of register sets (not explicitly shown in FIG. 6), each defining an AXI→RapidIO mapping window. In one example, the AXI→RapidIO multiple mapping window register 608 may store R AXI→RapidIO register sets, and each may be according to the previously described FIG. 2 DC AXI→RapidIO mapping register set 202.

Referring still to FIG. 6, provision for selecting from among the R AXI→RapidIO mapping windows in the AXI→RapidIO multiple mapping window register 608, and for using the parameters defining the selected AXI→RapidIO mapping window in translating packets, a translation configuration logical path 616 may couple the AXI→RapidIO multiple mapping window register 608 to the AXI⇆RapidIO inbound request XLT block 602 and to the AXI⇆RapidIO outbound request XLT block 604. Further, the AXI⇆RapidIO outbound request XLT block 604 may provide through, for example, the AXI"RapidIO mapping window select path 618, the destination address of AXI transaction requests to the AXI→RapidIO multiple mapping window register 608. The AXI→RapidIO multiple mapping window register 608 may be configured to identify which of its stored AXI-→RapidIO mapping windows, e.g., which of the FIG. 2 DC AXI→RapidIO mapping register sets 202, matches the destination address. Further, the AXI→RapidIO multiple mapping window register 608 may be configured to provide the translation rules defining the identified matching AXI→RapidIO mapping window to the AXI⇆RapidIO inbound request XLT block 602 and to the outbound AXI request AXI⇆RapidIO XLT block 604, for the use in translating the AXI packet to a RapidIO internal packet, as described in greater detail at later sections.

Referring still to FIG. 6, the example DC multiple mapping window AXI⇆RapidIO bridge 600 may further include a RapidIO logical and transport layer (LTL) configuration register 620 for holding RapidIO logical and transport layer parameters not particular to the present embodiments. Persons of ordinary skill in the arts of interfacing with RapidIO can, upon reading this disclosure, readily identify and implement a RapidIO logical and transport layer configuration register 620 and, therefore, further detail description is omitted. In addition, the example DC multiple mapping window AXI⇆RapidIO bridge 600 may include a RapidIO memory 622, coupled between the RapidIO logical and transport layer 610 and both the inbound RapidIO XLT block 602 and the outbound AXI request AXI⇆RapidIO XLT block 604. It will be understood by persons of ordinary skill in the art from reading this disclosure that the RapidIO memory 622 may be used to buffer AXI and RapidIO payload data corresponding to transactions performed in practicing according to the exemplary embodiments.

It will be understood that an administrative entity, for example one the AXI master devices AX_MD1 or AXI_MD2, may program the AXI→RapidIO multiple mapping window register 608 using a process substantially the same as the FIG. 4 example programming process 400. For example, referring to FIGS. 4 and 6 together, at 404 either the master device AXI_MD1 or AXI_MD2 may issue the configuration command, addressed to the AXI slave port AXI_SP1, with a destination address corresponding to one of the DC AXI→RapidIO mapping register sets 202 stored in the AXI→RapidIO multiple mapping window register 608.

The outbound AXI request XLT block 604 may be configured to detect this configuration command and, in response, initiate the requested configuration.

The FIG. 6 example DC multiple mapping window AXI⇆RapidIO bridge 600 has been described in a configuration having R AXI→RapidIO mapping windows, each dynamically configurable by programming the AXI⇆RapidIO multiple mapping window register 608 as described above. As will be appreciated by persons of ordinary skill in the art, in one alternative a plurality of RapidIO→AXI mapping windows (not shown) may be provided as well by, for example, combining the FIG. 6 example with basically a duplicate of the AXI→RapidIO multiple mapping window register 608, except each defining a RapidIO→AXI mapping window instead of a AXI→RapidIO mapping window.

Figure 7:
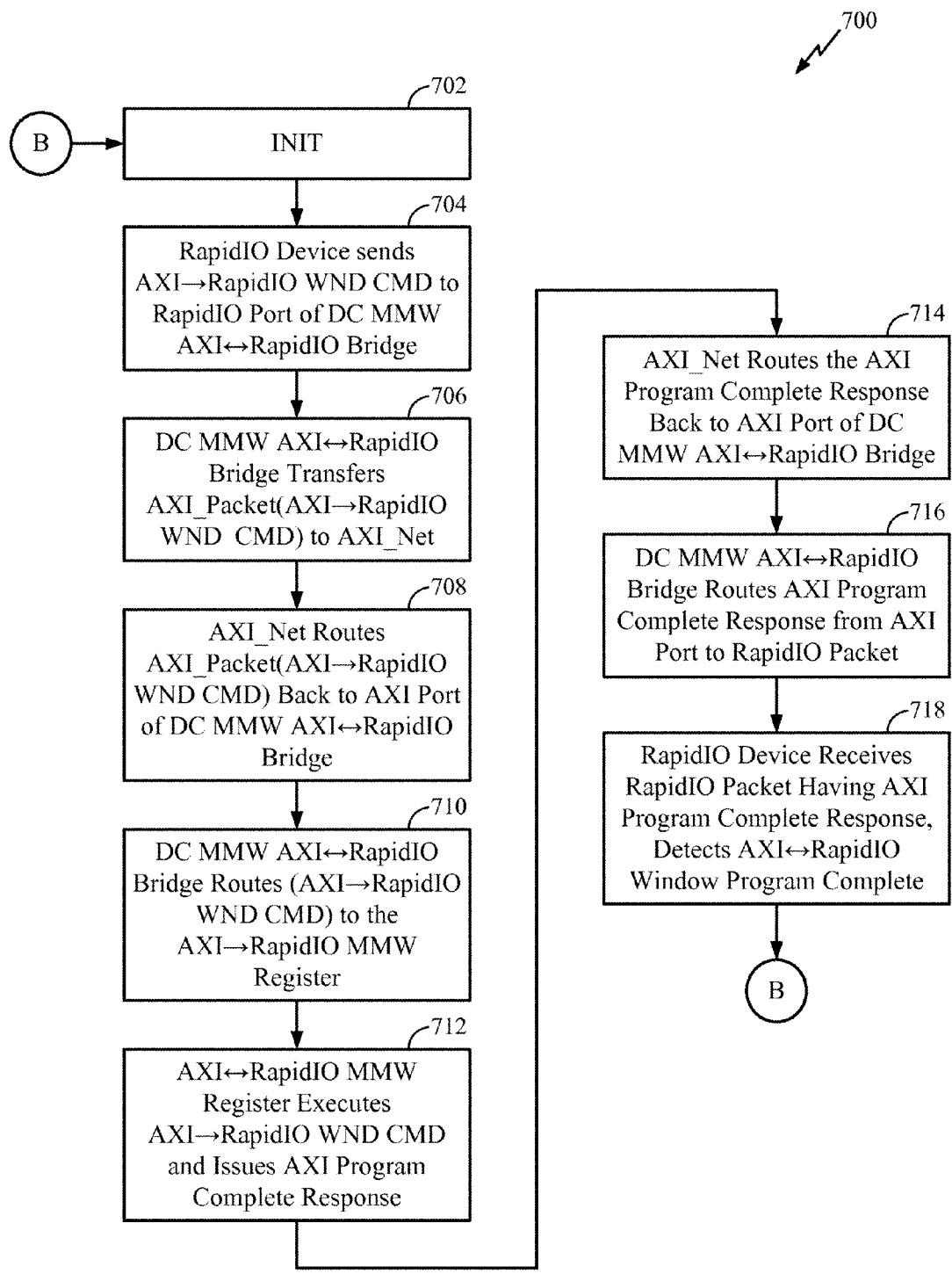
FIG. 7 shows a logic flow in one example of configuring mapping windows in one dynamically configurable multiple mapping window bridge, for bridging example protocols according to one exemplary embodiment.

In one aspect, the FIG. 6 example DC multiple mapping window AXI⇆RapidIO bridge 600 may be configured to provide for programming the AXI→RapidIO multiple mapping window register 608 from an administrative entity within the RapidIO_Net. FIG. 7 shows a logical process flow for one example programming process 700 for such programming the AXI→RapidIO multiple mapping window register 608 from an administrative entity within the RapidIO_Net. It will be understood that for labeling clarity on FIG. 7 the phrase "multiple mapping window" is abbreviated as "MMW."

Referring to FIG. 7, the programming process 700 may begin at an initial state 702, which may be the same as the FIG. 4 initial state 402. Next, at 704 a RapidIO device (not shown) issues RapidIO request packets targeting the AXI→RapidIO multiple mapping window register 608. The RapidIO request packets issued at 704 are referred to as "RapidIO AXI→RapidIO WND CMD." At 706 the RapidIO Issued AXI→RapidIO WND CMD may be transferred through the DC multiple mapping window AXI⇆RapidIO bridge 600, to the AXI_Net, as a AXI packet translation of a RapidIO transaction request, but having the AXI→RapidIO multiple mapping window register 608 as its target address. The AXI packet output at 706 may be referenced as the "AXI Packet(AXI→RapidIO WND CMD)." In one aspect the DC multiple mapping window AXI⇆RapidIO bridge 600 may be configured to not detect this AXI Packet(AXI→RapidIO WND CMD) output at 706 and, instead, it will be assumed that the AXI_Net will detect it. Accordingly, at 708 the AXI_Net may decode the target address of the AXI Packet (AXI→RapidIO WND CMD) generated and sent at 706 and detect it is targeted to an address space within the AXI→RapidIO multiple mapping window register 608. Accordingly, at 708 the AXI_Net may route the AXI Packet (AXI→RapidIO WND CMD) to the AXI slave port AXI_SP1 of the example DC multiple mapping window AXI⇆RapidIO bridge 600.

Referring still to FIG. 7, at 710 the example DC multiple mapping window AXI⇆RapidIO bridge 600 may, upon receiving the AXI Packet(AXI→RapidIO WND CMD) sent to its AXI slave port AXI_SP1, route the AXI Packet (AXI→RapidIO WND CMD), or a content of that packet, to the AXI→RapidIO multiple mapping window register 608. For example, the outbound AXI request XLT block 604, being configured as previously described to detect RapidIO→AXI mapping window configuration commands, detects that the AXI Packet(AXI→RapidIO WND CMD) is not for the RapidIO_Net and, accordingly, route the AXI Packet (AXI→RapidIO WND CMD) to the AXI→RapidIO multiple mapping window register 608. Then at 712 the AXI→RapidIO multiple mapping window register 608 may execute programming transactions in accordance with the AXI→RapidIO WND CMD command content of the AXI Packet(AXI→RapidIO WND CMD) and, when complete, may send an AXI protocol transaction complete response (AXI Program Complete Response) to the AXI slave port AXI_SP1 via, for example, the outbound AXI request XLT block 604. The AXI Program Complete Response may have a target address, though, that is not of any device within the AXI_Net but, instead, is (or indicates) the RapidIO address of the RapidIO device that sent the AXI→RapidIO WND CMD at 704. In other words, the AXI Program Complete Response may, in one aspect, be configured to appear to the AXI_Net as a regular AXI response to a transaction request (such as a read of the AXI_SD1 DRAM) that originated from the RapidIO device that sent the AXI→RapidIO WND CMD at 704. Therefore, upon the AXI_Net receiving the AXI Program Complete Response at 712, the programming process 700 may go to 714 where the interconnect AXI_Net may route this AXI Program Complete Response to the AXI master port AXI_MP1, which is the port from which a transaction request from a RapidIO device would, after translation to AXI protocol, have been received at the AXI_Net.

Continuing to refer to FIG. 7, in one aspect the DC multiple mapping window AXI⇌RapidIO bridge 600 may be configured so that, upon receiving the AXI Complete Response sent to it at 714, the bridge 600 will at 716 route this AXI Complete Response back to the RapidIO device that, at 704, issued the AXI→RapidIO WND CMD. In other words, at 716 the inbound RapidIO request XLT block 602 may, upon receiving the AXI Complete Response, process it as a response to a regular RapidIO transaction request. The processing may, for example, be as previously described for the FIG. 3 example DC multiple mapping window YP⇌XP bridge 300, in its processing a YP transaction request received at the YP physical layer 306, including handling a response from the XP slave DRAM. Stated differently, at 716 the inbound RapidIO request XLT block 602 may translate the AXI Complete Response into a RapidIO format, forward this to the AXI-to-RapidIO arbiter 614 that, in turn, may forward it through the RapidIO logical and transport layer 610 and RapidIO physical layer 606 as a RapidIO_Packet (AXI Complete Response), targeted to the RapidIO device that issued the AXI→RapidIO WND CMD at 704. Then, at 718, the RapidIO device that issued the AXI→RapidIO WND CMD at 704 may, upon receiving the RapidIO Packet (AXI Complete Response), detect the programming as complete.

One example transaction process, showing several aspects in relation to example configurations for the windows of the AXI→RapidIO multiple mapping window registers 608 will now be described. The examples will be described in reference to the previously described FIG. 5 example transaction process 500, with additional reference to the FIG. 6 example DC multiple mapping window AXI⇌RapidIO bridge 600.

In one example, the AXI→RapidIO multiple mapping window register 608 may be configured to have one DC AXI→RapidIO mapping register sets 202 defining an AXI→RapidIO mapping windows with a first AXI address space, and mapping AXI transaction requests to a given window in the RapidIO address space, with the translation into a RapidIO transaction request having a high priority and being in "fast response mode." The one example may further include the AXI→RapidIO multiple mapping window register 608 being configured to have another DC AXI→RapidIO mapping register set 202 defining an AXI→RapidIO mapping windows with a second AXI address space, and mapping AXI transaction requests to the same given window in the RapidIO address space as the first AXI→RapidIO mapping windows, but mapping the AXI transaction request to a RapidIO transaction request having a normal priority, and being in "normal response mode." It will be appreciated that among other benefits, the example of two AXI→RapidIO mapping windows to the same RapidIO window effectively provides for assigning concurrent AXI-RapidIO bridges to two AXI master devices, allowing these to simultaneously send transactions to the bridge, with the bridge being concurrently optimized to both of the AXI master devices. For example, the AXI_MD1 may be a digital signal processor (DSP) requiring fast access, while the AXI_MD2 may be an application processor (APP) having lower access requirements. By configuring two AXI→RapidIO mapping windows in the AXI→RapidIO multiple mapping windows register 608, each of the AXI_MD1 (DSP) and AXI_MD2 (APP) may be effectively provided with its own, dynamically configurable AXI→RapidIO bridge. The AXI_MD1/DSP may be configured (e.g., programmed) to direct its XP transaction requests to the AXI→RapidIO mapping window defined by the first AXI address space, while the AXI_MD2/APP may be configured (e.g., programmed) to direct its AXI transaction requests to the AXI→RapidIO mapping window defined by the second AXI address space.

Continuing with one example, the AXI transaction requests issued by either of the AXI_MD1/DSP or the AXI_MD2/APP may enter the bridge 600 through the AXI slave port implemented by the outbound AXI request AXI⇌RapidIO XLT block 604. The outbound AXI request AXI⇌RapidIO XLT block 604, upon receiving the AXI transaction request, may obtain the AXI→RapidIO translation rules from the DC AXI→RapidIO mapping register set 202 defining the AXI→RapidIO window definition to which the AXI transaction request is directed. This may be performed by, the outbound AXI request AXI⇌RapidIO XLT block 604 providing the AXI→RapidIO multiple mapping window register 608 with the destination address of the AXI transaction request, for example through the logic path 618. The AXI→RapidIO multiple mapping window registers 608 may then retrieve the AXI→RapidIO translation rules within the DC AXI→RapidIO mapping register set 202 having an AXI address space matching the destination address. The outbound AXI request AXI⇌RapidIO XLT block 604 may then translate the AXI transaction request into a RapidIO transaction request using the retrieved AXI→RapidIO translation rules, targeted to the RapidIO device defined by the matching DC AXI→RapidIO mapping register set 202. The resulting RapidIO transaction request packet then enters the AXI-to-RapidIO port 610C of the RapidIO logical layer and transport layer block 610 via the AXI-to-RapidIO arbiter 614 and then passes from the RapidIO I/O port 610A to the RapidIO physical layer 606, directed to the target RapidIO device. In one aspect the target RapidIO device may be a slave RapidIO device.

Continuing with the present example in which the AXI→RapidIO multiple mapping window register 608 are configured with a first AXI-RapidIO mapping window and a second AXI-RapidIO mapping window, if the AXI transaction request was directed to the first window, the mapped RapidIO transaction request would require no response. Therefore, referring to FIG. 5, the transaction process 500 may go to 520 where it terminates, and then return to the initial state 502. If the determination at 514 was that a response was required then the process goes from 518 to 522 where it waits for the RapidIO response. The waiting may correspond to the FIG. 5 flow diagram "waiting for Response_to_XPTR." When the response is received the DC multiple mapping window AXI⇌RapidIO bridge 600 bridge processes it according to 524, 526, and 528, with "AXI" substituting for "XP" and "RapidIO" substituting for "YP," and with particular blocks of FIG. 6 substituting for the references to blocks of FIG. 3. As will be understood, the AXI_Net will route the AXI packet translation of the RapidIO response that was performed by the outbound AXI request XLT block 604 the AXI-MSD1/DSP or the AXI-MSD2_APPS device, depending on which issued the AXI request.

In one aspect, the DC multiple mapping window AXI⇔RapidIO bridge 600 may receive RapidIO request packets at the RapidIO physical layer, whereupon these are routed through the RapidIO logical and transport layers 610 to the RapidIO-to-AXI arbiter 612, and then to the inbound RapidIO request XLT block 602. The inbound RapidIO request XLT block 602 translates the received inbound RapidIO transaction request to an inbound AXI transaction request, which the AXI_Net routes to, for example, the DRAM. The AXI response from the DRAM is received at the inbound RapidIO request XLT block 602, which translates it to a RapidIO response and sends it through the AXI-to-RapidIO arbiter 614 to the RapidIO logical and transport layers 610. The RapidIO logical and transport layers 610 then, through the RapidIO physical layer 606, send the RapidIO packet having the response from the DRAM to the RapidIO device that send the request.

It will be understood, and appreciated as another among the features of the exemplary embodiments that one of the AXI master devices, e.g., AXI_MD2, may be designated (through assignment and management of administrative rights) as the entity that programs the AXI→RapidIO multiple mapping window register 608. Also, as previously described, further to this aspect the one AXI master device designated as programming the AXI→RapidIO multiple mapping window register 608 may be further configured to notify other entities in the AXI_Net of the particular configuration of the AXI→RapidIO multiple mapping window register 608 e.g., AXI_MD1.

Figure 8:
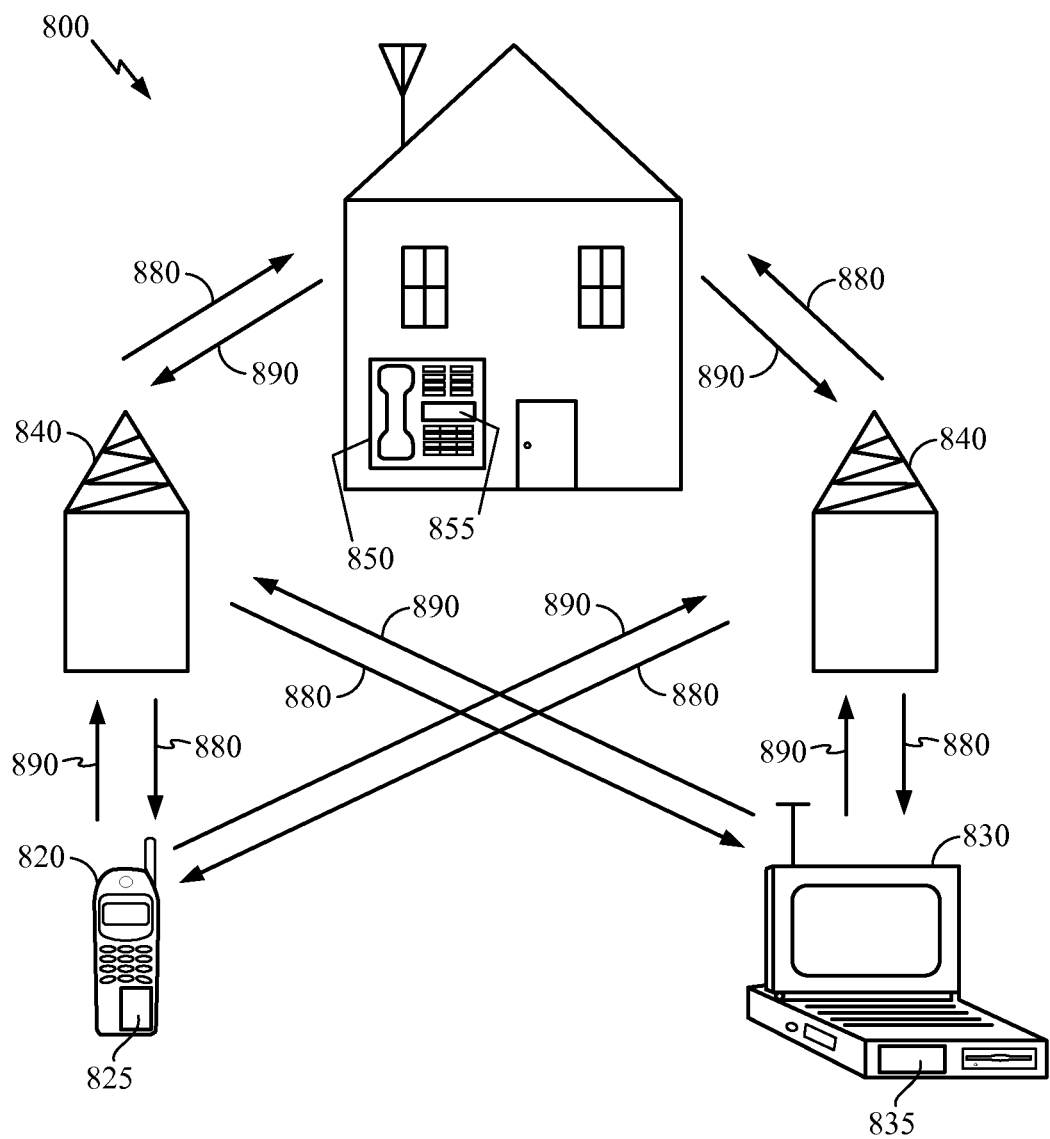
FIG. 8 shows a functional block diagram of one example personal computing device according to one exemplary embodiment.

FIG. 8 illustrates an exemplary wireless communication system 800 in which one or more embodiments of the disclosure may be advantageously employed. For purposes of illustration, FIG. 8 shows three remote units 820, 830, and 850 and two base stations 840. It will be recognized that conventional wireless communication systems may have many more remote units and base stations. The remote units 820, 830, and 850 include semiconductor devices 825, 835 and 855 which are among embodiments of the disclosure as discussed further below. FIG. 8 shows forward link signals 880 from the base stations 840 and the remote units 820, 830, and 850 and reverse link signals 890 from the remote units 820, 830, and 850 to the base stations 840.

In FIG. 8, the remote unit 820 is shown as a mobile telephone, the remote unit 830 is shown as a portable computer, and the remote unit 850 is shown as a fixed location remote unit in a wireless local loop system. For example, the remote units may be mobile phones, hand-held personal communication systems (PCS) units, portable data units such as personal data assistants, navigation devices (such as GPS enabled devices), set top boxes, music players, video players, entertainment units, fixed location data units such as meter reading equipment, or any other device that stores or retrieves data or computer instructions, or any combination thereof. Although FIG. 8 illustrates remote units according to the teachings of the disclosure, the disclosure is not limited to these exemplary illustrated units. The disclosed device may be suitably employed in any device which includes a semiconductor device with an on-chip voltage regulator.

Figure 9:
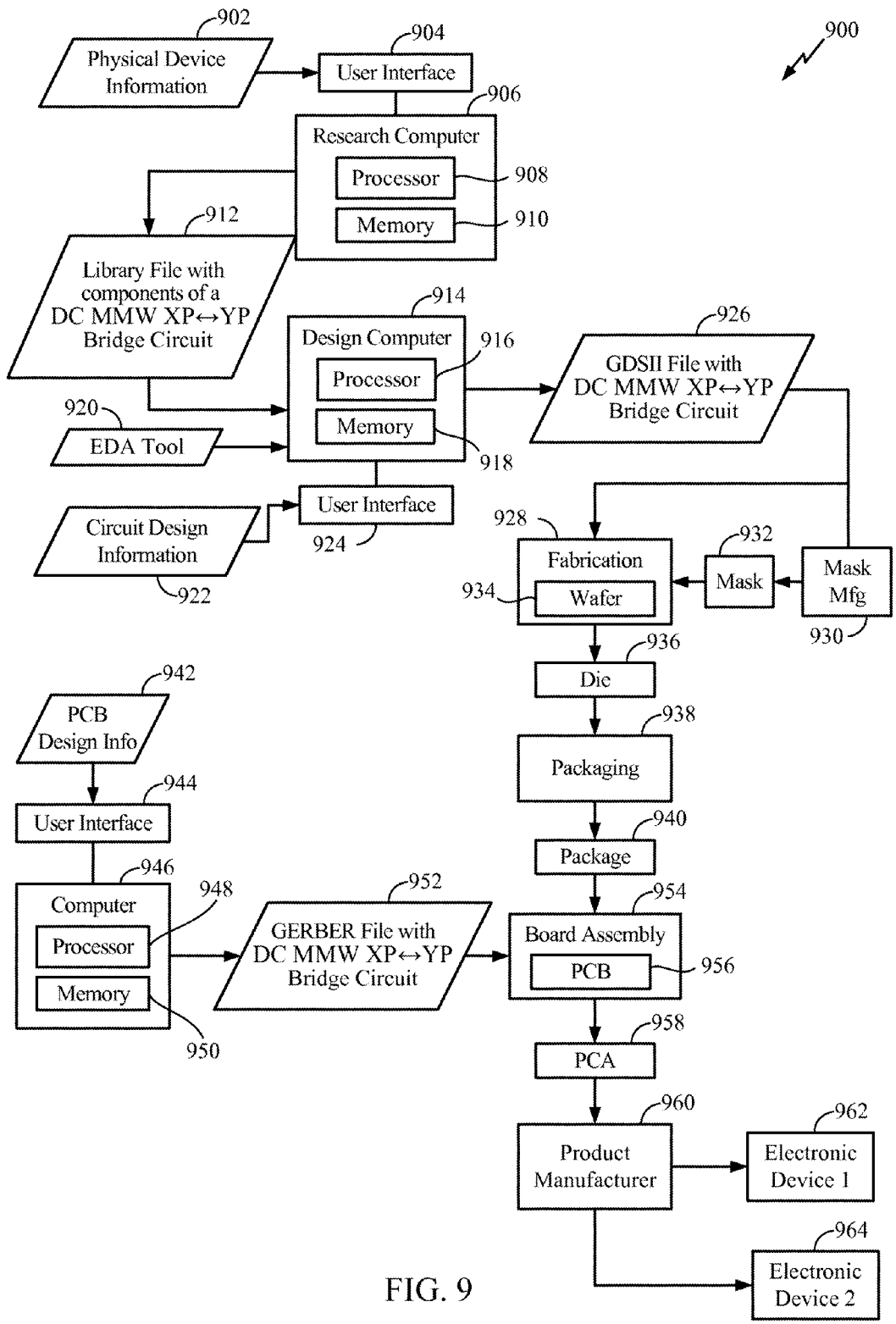
FIG. 9 is a functional flow diagram of one process in fabricating a memory device embodying a dynamically configurable multiple mapping window bridge according to one exemplary embodiment.

FIG. 9 depicts a particular illustrative embodiment of an electronic device manufacturing process 900. Physical device information 902 may be received in the manufacturing process 900, such as at a research computer 906. The physical device information 902 may include design information representing at least one physical property of the DC multiple mapping window X⇔Y and XP⇔YP protocol bridges described in reference to FIG. 1 or 3, or of the particular example DC multiple mapping window AXI⇔RapidIO bridges described in reference to FIG. 2 or 6, or, in one alternative, any combination thereof. In referencing FIG. 9 it will be noted that for labeling clarity the abbreviation "MMW" is used on the figure as an abbreviation for "multiple mapping window."

Referring to FIG. 9, the physical device information 902 may include physical parameters, material characteristics, and structure information that may be entered via a user interface 904 coupled to the research computer 906. The research computer 906 may include a processor 908, such as one or more processing cores, coupled to a computer readable medium such as a memory 910. The memory 910 may store computer readable instructions that are executable to cause the processor 908 to transform the physical device information 902 to comply with a file format and to generate a library file 912.

In a particular embodiment, the library file 912 may include at least one data file including the transformed design information. For example, the library file 912 may include a library of semiconductor devices including any device(s) of the DC multiple mapping window X⇔Y and XP⇔YP protocol bridges described in reference to FIGS. 1 and 3, or of the particular example DC multiple mapping window AXI⇔RapidIO bridges described in reference to FIG. 2 or 6, or, in one alternative, a combination thereof that is provided for use with an electronic design automation (EDA) tool 920.

The library file 912 may be used in conjunction with the EDA tool 920 at a design computer 914 including a processor 916, such as one or more processing cores, coupled to a memory 918. The EDA tool 920 may be stored as processor executable instructions at the memory 918 to enable a user of the design computer 914 to design a circuit including the DC multiple mapping window X⇔Y and XP⇔YP protocol bridges described in reference to FIGS. 1 and 3, or the particular example DC multiple mapping window AXI⇔RapidIO bridges described in reference to FIG. 2 or 6, or, in one alternative, a combination thereof, from the library file 912. For example, a user of the design computer 914 may enter circuit design information 922 via a user interface 924 coupled to the design computer 914. The circuit design information 922 may include design information representing at least one physical property of the DC multiple mapping window X⇔Y protocol bridges described in reference to FIGS. 1 and 3, or of the particular example DC multiple mapping window AXI⇔RapidIO bridges described in reference to FIG. 2 or 6, or, in one alternative, a combination thereof. To illustrate, the circuit design property may include identification of particular circuits and relationships to other elements in a circuit design, positioning information, feature size information, interconnection information, or other information representing a physical property of a semiconductor device.

The design computer 914 may be configured to transform the design information, including the circuit design information 922 to comply with a file format. To illustrate, the file formation may include a database binary file format representing planar geometric shapes, text labels, and other information about a circuit layout in a hierarchical format, such as a Graphic Data System (GDSII) file format. The design computer 914 may be configured to generate a data file including the transformed design information, such as a GDSII file 926 that includes the DC multiple mapping window X⇆Y protocol bridges described in reference to FIGS. 1 and 3, or the particular example DC multiple mapping window AXI⇆RapidIO bridges described in reference to FIG. 2 or 6, or, in one alternative, a combination thereof, in addition to other circuits or information. To illustrate, the data file may include information corresponding to the semiconductor devices 825, 835 and 855 of the remote units 820, 830, and 850 described in reference to FIG. 8.

The GDSII file 926 may be received at a fabrication process 928 to manufacture the DC multiple mapping window X⇆Y protocol bridge described in reference to FIGS. 1 and 3, or of the particular example DC multiple mapping window AXI⇆SRIO bridge described in reference to FIG. 2, or, in one alternative, a combination thereof, according to transformed information in the GDSII file 926. For example, a device manufacture process may include providing the GDSII file 926 to a mask manufacturer 930 to create one or more masks, such as masks to be used for photolithography processing, illustrated as a representative mask 932. The mask 932 may be used during the fabrication process to generate one or more wafers 934, which may be tested and separated into semiconductor dies, such as a representative semiconductor die 936. The semiconductor die (hereinafter referenced as "die") 936 may include a circuit having one or more devices of the semiconductor devices 825, 835 and 855 of the remote units 820, 830, and 850 described in reference to FIG. 8, or other devices of the DC multiple mapping window X⇆Y protocol bridge described in reference to FIGS. 1 and 3, or of the particular example DC multiple mapping window AXI⇆RapidIO bridges described in reference to FIG. 2 or 6, or, in one alternative, a combination thereof.

The die 936 may be provided to a packaging process 938 where the die 936 is incorporated into a representative package 940. For example, the package 940 may include the single die 936 or multiple dies, such as a system-in-package (SiP) arrangement. The package 940 may be configured to conform to one or more standards or specifications, such as Joint Electron Device Engineering Council (JEDEC) standards.

Information regarding the package 940 may be distributed to various product designers, such as via a component library stored at a computer 946. The computer 946 may include a processor 948, such as one or more processing cores coupled to a memory 950. A printed circuit board (PCB) tool may be stored as processor executable instructions at the memory 950 to process PCB design information 942 received from a user of the computer 946 via a user interface 944. The PCB design information 942 may include physical positioning information of a packaged semiconductor device on a circuit board, the packaged semiconductor device corresponding to the package 940 for the DC multiple mapping window X⇆Y and XP⇆YP protocol bridges described in reference to FIGS. 1 and 3, or of the particular example DC multiple mapping window AXI⇆RapidIO bridges described in reference to FIG. 2 or 6, or, in one alternative, a combination thereof.

The computer 946 may be configured to transform the PCB design information 942 to generate a data file, such as a GERBER file 952 with data that includes physical positioning information of a packaged semiconductor device on a circuit board, as well as layout of electrical connections such as traces and vias, where the packaged semiconductor device corresponds to the package 940 including, for example, the DC multiple mapping window X⇆Y and XP⇆YP protocol bridges described in reference to FIGS. 1 and 3, or the particular example DC multiple mapping window AXI⇆RapidIO bridge described in reference to FIG. 2 or 6, or, in one alternative, a combination thereof. In other embodiments, the data file generated by the transformed PCB design information may have a format other than a GERBER format.

The GERBER file 952 may be received at a board assembly process 954 and used to create PCBs, such as a representative PCB 956, manufactured in accordance with the design information stored within the GERBER file 952. For example, the GERBER file 952 may be uploaded to one or more machines for performing various steps of a PCB production process. The PCB 956 may be populated with electronic components including the package 940 to form a represented printed circuit assembly (PCA) 958.

The PCA 958 may be received at a product manufacture process 960 and integrated into one or more electronic devices, such as a first representative electronic device 962 and a second representative electronic device 964. As an illustrative, non-limiting example, the first representative electronic device 962, the second representative electronic device 964, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 962 and 964 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. With respect to remote units, although FIG. 5 may illustrate remote units according to the teachings of the disclosure, the disclosure is not limited to these exemplary illustrated units. Embodiments of the disclosure may be suitably employed in any device that includes active integrated circuitry including memory and on-chip circuitry for test and characterization. Thus, the DC multiple mapping window X⇆Y and XP⇆YP protocol bridges described in reference to FIGS. 1 and 3, or of the particular example DC multiple mapping window AXI⇆RapidIO bridges described in reference to FIG. 2 or 6, or, in one alternative, a combination thereof, may be fabricated, processed, and incorporated into an electronic device, as described in the illustrative process 900. One or more aspects of the embodiments disclosed with respect to FIGS. 1-6 may be included at various processing stages, such as within the library file 912, the GDSII file 926, and the GERBER file 952, as well as stored at the memory 910 of the research computer 906, the memory 918 of the design computer 914, the memory 950 of the computer 946, the memory of one or more other computers or processors (not shown) used at the various stages, such as at the board assembly process 954, and also incorporated into one or more other physical embodiments such as the mask 932, the die 936, the package 940, the PCA 958, other products such as prototype circuits or devices (not shown), or any combination thereof. Although various representative stages of production from a physical device design to a final product are depicted, in other embodiments fewer stages may be used or additional stages may be included. Similarly, the process 900 may be performed by a single entity, or by one or more entities performing various stages of the process 900.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer readable or processor readable storage medium known in the art. One exemplary computer readable or processor readable storage medium may embody or be embodied within a computer product. An exemplary storage medium is coupled to the processor such that the processor can read information from, and write information to, the storage medium. In the alternative, the storage medium may be integral to the processor. Accordingly, an embodiment of the invention can include a computer readable media embodying a method for bridging protocols, comprising receiving a first bus interface protocol transaction request having a transaction request parameter, selecting from a plurality of mapping windows according to a value of the transaction request parameter, and mapping the first bus interface protocol transaction request to a bus interface protocol transaction request in accordance with the selected mapping window. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A bridge, comprising:
    a first bus interface protocol port configured to receive a first bus interface protocol transaction request having a transaction request parameter indicating a destination address;
    a second bus interface protocol port; and
    a protocol mapping controller, including a plurality of mapping window registers, and configured to
        store at least a first mapping window and a second mapping window in the plurality of mapping window registers as a corresponding first plurality and second plurality of dynamically configurable transaction mapping parameters,
        wherein the first plurality of dynamically configurable transaction mapping parameters includes a first window location parameter indicating a first address space in the first bus interface protocol, and the second plurality of dynamically configurable transaction mapping parameters includes a second window location parameter indicating a second address space in the first bus interface protocol,
        wherein the first plurality and second plurality of dynamically configurable transaction mapping parameters each include a mapped transaction priority parameter, and define a corresponding at least one translation rule for translating the transaction request according to the first bus interface protocol into a transaction request according to the second bus interface protocol, wherein the corresponding translation rule defined by the mapped transaction priority parameter is transaction priority level within the second bus interface protocol;
        if the destination address of the first bus interface protocol transaction request matches any among the first address space and the second address space, select, as a selected mapping window, from the first and the second mapping windows according to said match; and to
        map the first bus interface protocol transaction request to a bus interface protocol transaction request on the second bus interface protocol port in accordance with the selected mapping window.

2. The bridge of claim 1, wherein at least one of the first and second mapping windows includes a target device identifier having a value identifying a second bus interface protocol device.

3. The bridge of claim 1, wherein at least one of the first and second mapping windows includes a target window identifier having a value identifying an address space in the second bus interface protocol.

4. The bridge of claim 1, wherein the first mapping window and the second mapping window each include a respective target window identifier identifying a corresponding window in the second bus interface protocol,
    wherein the first address space and the second address space indicate mutually different address spaces in the first bus interface protocol, and wherein the respective target window identifiers of the first mapping window and the second mapping window identify the same corresponding window in the second bus interface protocol.

5. The bridge of claim 4, wherein the first priority level and the second priority level are mutually different transaction priority levels in the second bus interface protocol.

6. The bridge of claim 1, wherein the first plurality or the second plurality of dynamically configurable transaction mapping parameters, or both, includes a mapped transaction confirmation parameter indicating a transaction confirmation mode defined within the second bus interface protocol and undefined within the first bus interface protocol, and wherein the protocol mapping controller is further configured to map the first bus interface protocol transaction request to a bus interface protocol transaction request having a confirmation mode defined within the second bus interface protocol in accordance with the mapped transaction confirmation parameter of the selected mapping window.

7. The bridge of claim 6, wherein the first mapping window, or the second mapping window, or both, include a respective target window identifier identifying a corresponding window in the second bus interface protocol,
  wherein the protocol mapping controller is further configured to store the first mapping window and the second mapping window to include respective mapping window location parameters indicating mutually different address spaces in the first bus interface protocol, and to store the first mapping window and the second mapping window to have the respective target window identifiers identifying the same window in the second bus interface protocol.

8. The bridge of claim 7, wherein the mapped transaction first confirmation parameter and the mapped transaction second confirmation parameter indicate mutually different first and second confirmation modes in the second bus interface protocol.

9. The bridge of claim 1, wherein the bridge is integrated in at least one semiconductor die.

10. The bridge of claim 9, further comprising a device, selected from the group consisting of a set top box, music player, video player, entertainment unit, navigation device, communications device, personal digital assistant (PDA), fixed location data unit, and a computer, into which the memory device is integrated.

11. A method for bridging protocols, comprising:
storing at least a first mapping window and a second mapping window in a plurality of mapping window registers as a corresponding first plurality and second plurality of dynamically configurable transaction mapping parameters,
  wherein storing the first plurality of dynamically configurable transaction mapping parameters include a first window location parameter indicating a first address space in the first bus interface protocol, and the second plurality of dynamically configurable transaction mapping parameters include a second window location parameter indicating a second address space in the first bus interface protocol,
  wherein the first plurality and second plurality of dynamically configurable transaction mapping parameters each include a mapped transaction priority parameter, and define a corresponding at least one translation rule for translating the transaction request according to the first bus interface protocol into a transaction request according to the second bus interface protocol, wherein the corresponding translation rule defined by the mapped transaction priority parameter is transaction priority level within the second bus interface protocol;
receiving at a first bus interface protocol port a first bus interface protocol transaction request having a transaction request parameter indicating a destination address;
if the destination address of the first bus interface protocol transaction request matches any among the first address space and the second address space, selecting, as a selected mapping window, from the first and second mapping windows according to the matching; and
mapping the first bus interface protocol transaction request to a bus interface protocol transaction request in a second bus interface protocol in accordance with the selected mapping window.

12. The method of claim 11, wherein the first plurality of transaction mapping parameters or the second plurality of transaction mapping parameters, or both, includes a mapping window location parameter having a value corresponding to a destination in the first bus interface protocol.

13. The method of claim 12, wherein the first plurality of transaction mapping parameters or the second plurality of transaction mapping parameters, or both, includes a mapping window location parameter indicating an address space in the first bus interface protocol.

14. The method of claim 11, wherein the first plurality of transaction mapping parameters or the second plurality of transaction mapping parameters, or both, includes a mapped transaction confirmation parameter indicating a transaction confirmation mode defined within the second bus interface protocol and undefined within the first bus interface protocol, and wherein the mapping according to mapping window includes mapping the first bus interface protocol transaction request into a transaction request according to the second bus interface protocol having the transaction confirmation mode indicated by the mapped transaction confirmation parameter.

15. The method of claim 11, further comprising:
programming the first mapping window, or the second mapping window, or both.

16. The method of claim 15, wherein the programming includes:
generating a mapping window programming command having a destination address and having at least one transaction mapping parameter;
selecting, as a selected window, among the first window and the second window, based on the destination address; and
configuring a mapping window register associated with the selected window, based on the mapping window programming command.

17. The method of claim 16, further comprising identifying a source of the mapping window programming command, and wherein configuring a mapping window register includes detecting a completion of the configuring and transmitting to the identified source a confirmation of detecting the completion.

18. The method of claim 15, wherein the programming comprises:
receiving a mapping window programming command in the first bus interface protocol; and
programming the first mapping window, or the second mapping window, or both, in accordance with the received mapping window programming command.

19. The method of claim 18, wherein the programming further comprises:
generating a completion of programming response; and
transmitting the completion of programming response to a target associated with the received mapping window programming command.

20. The method of claim 11, further comprising programming the first mapping window, or the second mapping window, or both, wherein the programming comprises:
receiving at a second bus interface protocol port a mapping window programming command in the second bus interface protocol;
translating the received mapping window programming command in the second bus interface protocol to a mapping window programming command packet in the first bus interface protocol, having a target address associated with the first mapping window or the second mapping window;
transmitting the mapping window programming command packet in the first bus interface protocol from the first bus interface protocol port to a net in the first bus interface protocol;

routing the mapping window programming command packet in the net in the first bus interface protocol to a mapping window registry associated with the target address; and programming at least one mapping window register in the mapping window registry associated with the target address in accordance with the routed mapping window programming command packet in the first bus interface protocol.

21. The method of claim 20, wherein the programming further comprises:

detecting a completion of programming the mapping window register in accordance with the routed mapping window programming command packet in the first bus interface protocol;

generating a response in the first bus interface protocol indicating said detecting a completion;

translating said response in the first bus interface protocol to a response in the second bus interface protocol;

transmitting the response in the second bus interface protocol from the second bus interface port to a net in the second bus interface protocol; and routing said response in the net in the second bus interface protocol to a target device.

22. A bridge for bridging protocols, comprising:

means for storing at least a first mapping window and a second mapping window as a corresponding first plurality and second plurality of dynamically configurable transaction mapping parameters, wherein the means for storing is configured to include in the first plurality of dynamically configurable transaction mapping parameters a first window location parameter indicating a first address space in the first bus interface protocol, and to include in the second plurality of dynamically configurable transaction mapping parameters a second window location parameter indicating a second address space in the first bus interface protocol, wherein the means for storing is configured to include a corresponding mapped transaction priority parameter in each of the first plurality and second plurality of dynamically configurable transaction mapping parameters, and wherein the first plurality and the second plurality of dynamically configurable transaction mapping parameters each define a corresponding at least one translation rule for translating the transaction request according to the first bus interface protocol into a transaction request according to the second bus interface protocol, wherein the corresponding translation rule defined by the mapped transaction priority parameter is a transaction priority level within the second bus interface protocol;

means for receiving at a first bus interface protocol port a first bus interface protocol transaction request having a transaction request parameter;

means for selecting if the destination address of the first bus interface protocol transaction request matches any among the first address space and the second address space, a selected mapping window from the first and second mapping windows according to the matching; and means for mapping the first bus interface protocol transaction request to a bus interface protocol transaction request in a second bus interface protocol in accordance with the selected mapping window.

23. The bridge of claim 22, wherein the first plurality of dynamically configurable transaction mapping parameters, or the second plurality of dynamically configurable transaction mapping parameters, or both, includes a mapping window location parameter having a value corresponding to a destination in the first bus interface protocol.

24. The bridge of claim 22, wherein the first plurality of dynamically configurable transaction mapping parameters, or the second plurality of dynamically configurable transaction mapping parameters, or both, parameters includes a mapped transaction confirmation parameter indicating a transaction confirmation mode defined within the second bus interface protocol and undefined within the first bus interface protocol, and wherein the means for mapping according to mapping window is configured to include mapping the first bus interface protocol transaction request into a transaction request according to the second bus interface protocol having the transaction confirmation mode indicated by the mapped transaction confirmation parameter.

25. The bridge of claim 22, further comprising:

means for programming the first mapping window, or the second mapping window, or both.

26. The bridge of claim 25, wherein the means for programming is configured to:

generate a mapping window programming command having a destination address and having at least one transaction mapping parameter;

select, as a selected window, among the first window and second window, based on the destination address; and configure a mapping window register associated with the selected mapping window, based on the mapping window programming command.

27. The bridge of claim 26, wherein the means for programming is further configured to identify a source of the mapping window programming command, detect a completion of the configuring and transmit to the identified source a confirmation of detecting the completion.

28. The bridge of claim 22, wherein the bridge is integrated in at least one semiconductor die.

29. The bridge of claim 22, further comprising a device, selected from the group consisting of a set top box, music player, video player, entertainment unit, navigation device, communications device, personal digital assistant (PDA), fixed location data unit, and a computer, into which the memory device is integrated.

30. A computer product having a computer readable medium comprising instructions that, when read and executed by a processor coupled to a bridge having a first bus interface protocol port and a second bus interface protocol port, cause the processor to:

store at least a first mapping window and a second mapping window, as a corresponding first plurality and second plurality of dynamically configurable transaction mapping parameters, wherein the first plurality of dynamically configurable transaction mapping parameters includes a first window location parameter indicating a first address space in the first bus interface protocol, and the second plurality of dynamically configurable transaction mapping parameters includes a second window location parameter indicating a second address space in the first bus interface protocol, wherein the first plurality and second plurality of dynamically configurable transaction mapping parameters each include a mapped transaction priority parameter, and define a corresponding at least one translation rule for translating the transaction request according to the first bus interface protocol into a transaction request according to the second bus interface protocol, wherein the corresponding translation rule defined by the mapped transaction priority parameter is transaction priority level within the second bus interface protocol;

receive at the first bus interface protocol port a first bus interface protocol transaction request having a transaction request parameter indicating a destination address;

if the destination address of the first bus interface protocol transaction request matches any among the first address space and the second address space, select, as a selected mapping window, from the first and second mapping windows according to the matching; and map the first bus interface protocol transaction request to a bus interface protocol transaction request in a second bus interface protocol in accordance with the selected mapping window.

31. The computer product of claim 30, further comprising instructions that, when read and executed by a processor, cause the processor to program the first mapping window, or the second mapping window, or both.

32. The computer product of claim 31, further comprising instructions that, when read and executed by a processor, cause the processor to program at least one of the plurality of mapping windows by:

generating a mapping window programming command having a destination address and having at least one transaction mapping parameter;

selecting, as a selected window, among the first window and the second window, based on the destination address; and configuring a mapping window register associated with the selected window, based on the mapping window programming command.

33. The computer product of claim 32, further comprising instructions that, when read and executed by a processor, cause the processor to identify a source of the mapping window programming command, and wherein configuring a mapping window register includes detecting a completion of the configuring and transmitting to the identified source a confirmation of detecting the completion.

34. A method for bridging protocols, comprising:

step of storing at least a first mapping window and a second mapping window in a plurality of mapping window registers as a corresponding first plurality and second plurality of dynamically configurable transaction mapping parameters, wherein the first plurality of dynamically configurable transaction mapping parameters includes a first window location parameter indicating a first address space in the first bus interface protocol, and the second plurality of dynamically configurable transaction mapping parameters includes a second window location parameter indicating a second address space in the first bus interface protocol, wherein the first plurality and second plurality of dynamically configurable transaction mapping parameters each include a mapped transaction priority parameter, and define a corresponding at least one translation rule for translating the transaction request according to the first bus interface protocol into a transaction request according to the second bus interface protocol, wherein the corresponding translation rule defined by the mapped transaction priority parameter is a transaction priority level within the second bus interface protocol;

step of receiving at a first bus interface protocol port a first bus interface protocol transaction request having a transaction request parameter indicating a destination address;

step of selecting, as a selected mapping window, if the destination address of the first bus interface protocol transaction request matches any among the first address space and the second address space, from the first and second mapping windows according to the matching; and step of mapping the first bus interface protocol transaction request to a bus interface protocol transaction request in a second bus interface protocol in accordance with the selected mapping window.

35. The method of claim 34, further comprising:

step of programming the first mapping window, or the second mapping window, or both.

36. The bridge of claim 1, wherein the protocol mapping controller is further configured to program the first mapping window, or the second mapping window, or both, from the second bus interface protocol port and, in association with said programming, to:

receive at the second bus interface protocol port a mapping window programming command in the second bus interface protocol;

translate the received mapping window programming command in the second bus interface protocol to a mapping window programming command packet in the first bus interface protocol, having a target address associated with the first mapping window or the second mapping window;

transmit the mapping window programming command packet in the first bus interface protocol from the first bus interface protocol port to a net in the first bus interface protocol;

receive a routing of the mapping window programming command packet in the net in the first bus interface protocol, to a mapping window registry associated with the target address; and program the window register in the mapping window registry associated with the target address in accordance with the routed mapping window programming command packet in the first bus interface protocol.

37. The bridge according to claim 25, wherein the means for programming is further configured to program the first mapping window, or the second mapping window, or both, from the second bus interface protocol port, and to receive at a second bus interface protocol port a mapping window programming command in the second bus interface protocol;

translate the received mapping window programming command in the second bus interface protocol to a mapping window programming command packet in the first bus interface protocol, having a target address associated with the first mapping window or the second mapping window;

transmit the mapping window programming command packet in the first bus interface protocol from the first bus interface protocol port to a net in the first bus interface protocol;

route the mapping window programming command packet in the net in the first bus interface protocol to a mapping window registry associated with the target address; and program at least one mapping window register in the mapping window registry associated with the target address in accordance with the routed mapping window programming command packet in the first bus interface protocol.

38. The computer of claim 30, wherein the computer readable medium further comprises instructions that, when read and executed by a processor coupled to a bridge having a first bus interface protocol port and a second bus interface protocol port, cause the processor to:

receive at a second bus interface protocol port a mapping window programming command in the second bus interface protocol;

translate the received mapping window programming command in the second bus interface protocol to a mapping window programming command packet in the first bus interface protocol, having a target address associated with the first mapping window or the second mapping window;

transmit the mapping window programming command packet in the first bus interface protocol from the first bus interface protocol port to a net in the first bus interface protocol;

receive a routing of the mapping window programming command packet in the net in the first bus interface protocol, to a mapping window registry associated with the target address; and program at least one mapping window register in the mapping window registry associated with the target address in accordance with the routed mapping window programming command packet in the first bus interface protocol.

* * * * *